(12) United States Patent
Ide et al.

(10) Patent No.: US 11,182,131 B2
(45) Date of Patent: Nov. 23, 2021

(54) SYSTEM AND METHOD THAT SUPPORT PRODUCTION MANAGEMENT

(71) Applicant: Hitachi, Ltd., Tokyo (JP)

(72) Inventors: Takaya Ide, Tokyo (JP); Yuki Naganuma, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/816,760

(22) Filed: Mar. 12, 2020

(65) Prior Publication Data

US 2021/0042093 A1 Feb. 11, 2021

(30) Foreign Application Priority Data

Aug. 8, 2019 (JP) ............................. JP2019-146252

(51) Int. Cl.
*G06F 8/34* (2018.01)
*H04L 29/08* (2006.01)

(52) U.S. Cl.
CPC .............. *G06F 8/34* (2013.01); *H04L 67/141* (2013.01)

(58) Field of Classification Search
CPC ................................. G06F 8/34; H04L 67/141
See application file for complete search history.

(56) References Cited

U.S. PATENT DOCUMENTS

| | | | | |
|---|---|---|---|---|
| 2014/0003407 A1* | 1/2014 | Park | ...................... | H04W 48/17 370/338 |
| 2014/0335903 A1* | 11/2014 | Takeuchi | ............ | H04L 63/0407 455/461 |
| 2016/0062552 A1* | 3/2016 | Jeong | .................... | G06F 3/0488 715/788 |
| 2016/0092176 A1* | 3/2016 | Straub | ................... | G06F 3/0486 717/107 |
| 2016/0232013 A1* | 8/2016 | O'Neill | ................... | G06F 9/451 |
| 2017/0070573 A1* | 3/2017 | Takase | ................ | H04L 67/1097 |
| 2017/0364380 A1* | 12/2017 | Frye, Jr. | .................... | G06F 8/65 |
| 2018/0069804 A1 | 3/2018 | Laplanche et al. | | |
| 2018/0081642 A1* | 3/2018 | Alurralde Iturri | ........ | G06F 8/35 |
| 2020/0344084 A1* | 10/2020 | Shribman | ........... | H04L 12/4633 |
| 2021/0266271 A1* | 8/2021 | Momchilov | .......... | H04L 67/142 |

OTHER PUBLICATIONS

Curbera et al, "Composing RESTful Services and Collaborative Workflows", [Online], 2008, pp. 24-31, retrived from internet on Aug. 30, 2021, <https://ieeexplore.ieee.org/stamp/stamp.jsp?tp=&arnumber=4620091> (Year: 2008).*

* cited by examiner

*Primary Examiner* — S. Sough
*Assistant Examiner* — Zengpu Wei
(74) *Attorney, Agent, or Firm* — Mattingly & Malur, PC

(57) ABSTRACT

A service cooperation support system transmits a creation request concerning an external service to a service management system having a creation function concerning the external service, when a flow on a flow editing screen includes a service using node, and a user request for connecting the external service to the service using node is detected, and the system acquires, from the service management system, connection information (information created by the service management system) for connection to the external service created by the service management system in response to the creation request. The service cooperation support system sets the acquired connection information in the property of the service using node.

7 Claims, 15 Drawing Sheets

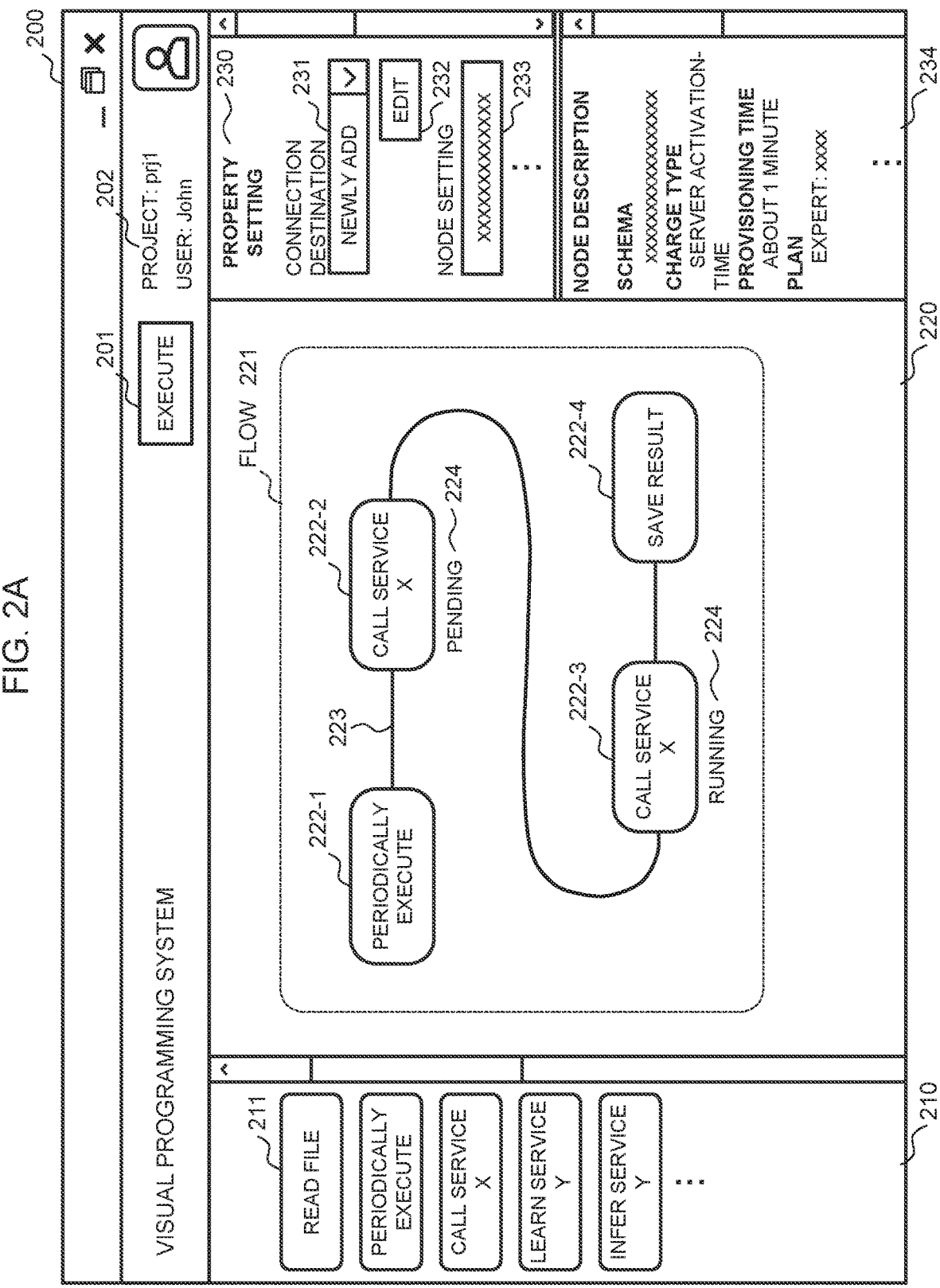

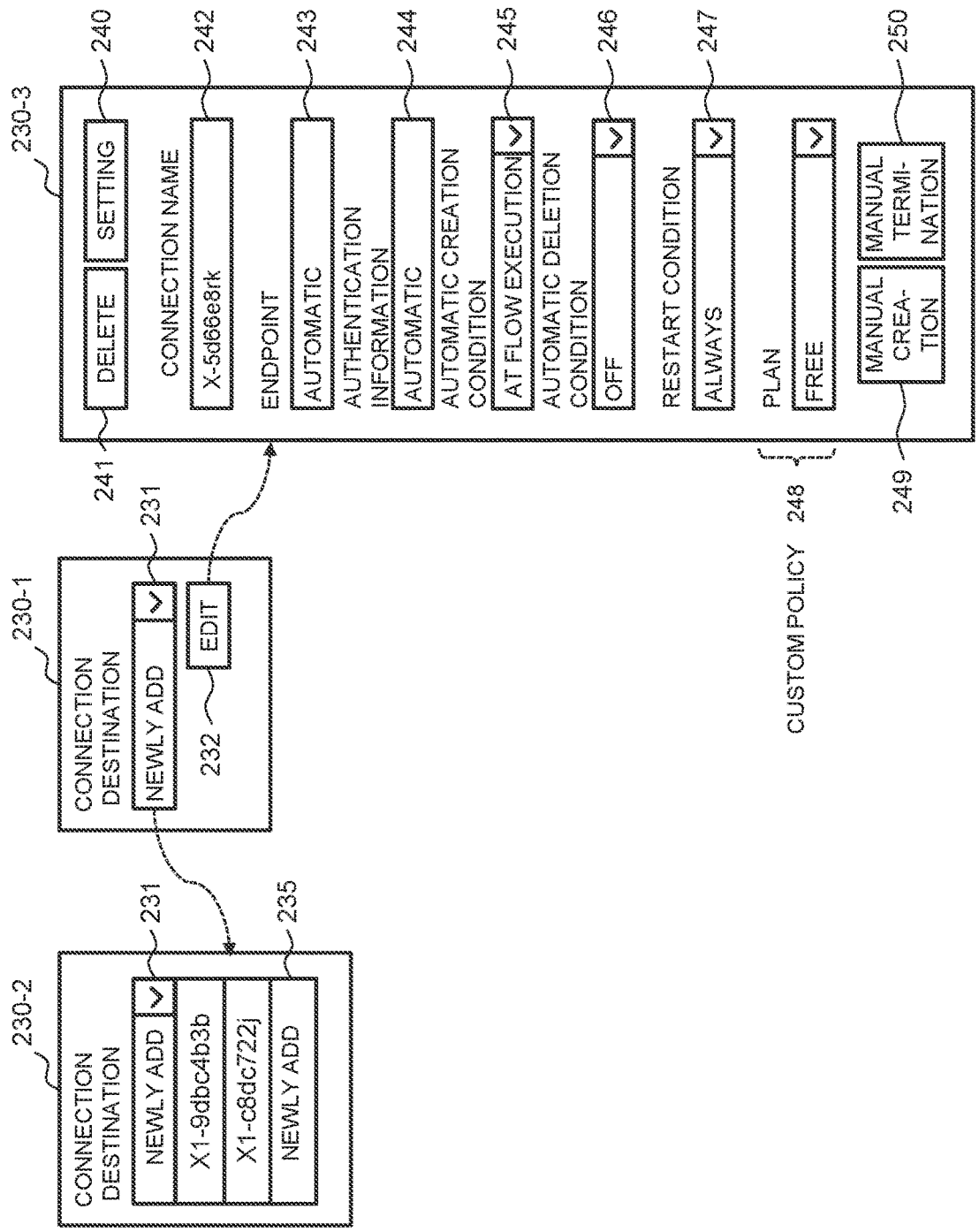

FIG. 4

```
[
    {
401 ──── "node_id": "sjd03n82",
402 ──── "node_type": "inject",
403 ──── "node_name": "PERIODICALLY EXECUTE",
404 ──── "properties": {
            "repeat": true,
            "interval": 5000, ...
        },
405 ──── "x": 160,
405 ──── "y": 90,
406 ──── "wires": [ [ "ba9o3nx8" ] ]
    },
    {
        "node_id": "ba9o3nx8",
        "node_type": "call serviceX",
        "node_name": "CALL SERVICE X1",
        "properties": {
407 ────    "resourceId": "9dbc4b3b",
            "NODE SETTING1": "xxx",
            "NODE SETTING2": 100, ...
        },
        "x": 280,
        "y": 90,
        "wires": [ [ "28602f3c" ] ]
    },
    ...
]
```

400 encompasses the first node object. 13 labels the outer container.

FIG. 5

POLICY INFORMATION 55

| ResourceId | ServiceId | ProjectId | Name | Provision | Delete | Restart | Custom Policy |
|---|---|---|---|---|---|---|---|
| 9dbc4b3b | X | prj1 | X-conn1 | AT NODE USE | AT NODE DELETION | ALWAYS | { "PLAN": "FREE" } |
| gq8z922j | Y | prj1 | X-conn2 | OFF | OFF | OFF | { "PLAN": "FREE" } |
|  |  |  |  |  |  |  |  |

(500, 501, 502, 503, 504, 505, 506, 507)

SERVICE DEFINITION INFORMATION 56

| ServiceId | CustomPolicy | Monitoring | Overview | Charges | Custom Description |
|---|---|---|---|---|---|
| X | { "PLAN": { "description": "...", "schema": { "type": "string", "enum": ["STANDARD", "EXPERT", ... ], ... } } | { "endpoint": "${conn ENDPOINT}", "path": "/status", "port": 443, "httpHeaders": { ... }, ... } | xxxxxxxxxx xxxxxxxxxx xxxxxxxxxx xxxxxxxxxx xxxxxxxxxx | SERVER ACTIVATION TIME | ## PROVISIONING TIME ¥nABOUT 1 MINUTE : |
|  |  |  |  |  |  |

(510, 511, 512, 513, 514, 515)

MANAGEMENT SYSTEM INFORMATION 57

| SystemId | Endpoint | Credential | Services |
|---|---|---|---|
| brokerX | https://osb.x1svc.com | {"token": "2gFtgT"} | ["X", "XA", "XB"] |
| brokerY | 40.115.yyy.yyy | {"user": "partner", "password": "z9gngk"} | ["Y1", "Y2", "Y3", "Y4", "Y5"] |
|  |  |  |  |

CONNECTION INFORMATION LIST
35

| ResourceId | ServiceId | Endpoint | Credential | Status |
|---|---|---|---|---|
| 9dbc4b3b | X1 | https://9bdc4b3b.x1svc.com | {"token": "bmFtZSI6IkpvaG4gRG"} | Pending |
| gq8z922j | Y5 | 40.115.xxx.xxx | {"user":"grp1", "password": "g8H3nw8d"} | Running |
| ⋮ | ⋮ | ⋮ | ⋮ | ⋮ |

SYSTEM AND METHOD THAT SUPPORT PRODUCTION MANAGEMENT

CROSS-REFERENCE TO PRIOR APPLICATION

This application relates to and claims the benefit of priority from Japanese Patent Application number 2019-146252, filed on Aug. 8, 2019 the entire disclosure of which is incorporated herein by reference.

BACKGROUND

The present invention generally relates to a technology that supports application software development and, in particular, relates to a technology of supporting development using a visual programming system.

To improve the functionality of an application, the application is sometimes constructed using various kinds of software provided as services, for example, a database service, a speech recognition service and the like. These services are each invoked from a program constituting the application via an API (Application Programming Interface), and the function is used. Accordingly, a developer can use the functions that various services have, without implementation.

Meanwhile, to make an application matching the market value, programming is performed in small units, and an application is developed by trial and error. At this time, a visual programming system is sometimes used to develop an application program. Visual programming is a method of constructing a program by arranging and connecting components visualized by icons. Using the visual programming system allows the developer to develop quickly a program through intuitive and small operations.

Accordingly, development of an application that invokes various services, using the visual programming system, allows programming an application using the functions of various services by trial and error at high speed, thus resulting in a possibility that an application having a higher market value can be developed.

However, to use the function of a service from the visual programming system, a preliminary operation is required where the developer preliminarily creates a service (including a process of achieving a usable state, such as provisioning), acquires connection information on the service (for example, information that includes information representing an endpoint, and authentication information), and registers the connection information as setting in the visual programming system. There is a problem in that increase in the number of services, in turn, increases the operation load, thus preventing application development from being performed at high speed by trial and error.

Accordingly, it is desirable that to use the service in the visual programming system, the service be created dynamically in response to the developer's operation of the visual programming system, and be accessible from the visual programming system without connection information setting. Reference 1 is listed as a technology usable to achieve this. Note that the visual programming system may be referred to as "model development environment". Each node represents a software component or processing unit, and each connection line between nodes may be referred to as "edge". The node and the edge are digraph terms, and a flow diagram can be regarded as a digraph. In the present specification, flow diagram, block diagram, and digraph are synonymous with each other, and thus a flow diagram is simply referred to as a "flow", and "flow" and "graph" are synonymous with each other. The flow is, typically, a DAG (Directed Acyclic Graph).

Reference 1: US2018/0069804A1

SUMMARY

In a case where a service is dynamically created and connected from the visual programming system, Reference 1 has the following problems 1 and 2, for example.

(Problem 1) A method of causing a user device corresponding to the visual programming system to issue a service creation request (create service request) to an on-demand service broker, is not disclosed. To develop the application at high speed by trial and error, a developer's possible creation and deletion of services required every time the program is changed, prevent high-speed trial and error. It is desirable to detect change and execution of the program and dynamically create the service. However, Reference 1 cannot achieve this.

(Problem 2) The correspondence relationship between the service connection information and the node (a component visualized by an icon; in the visual programming system, the flow is constructed by connecting the nodes) is not managed. Furthermore, the connection information cannot dynamically be reflected in nodes. In the visual programming system, an innumerable number of nodes are connected to various services, and a plurality of nodes are connected to the identical service in some cases. Accordingly, it is difficult to manage the connection relationship between the service and node by the user, and to register the setting manually every time the service is created.

A service cooperation support system transmits a creation request concerning an external service of a visual programming system to a service management system having a creation function concerning the external service, when a flow on a flow editing screen provided by the visual programming system includes a service using node that is a node for invoking the external service, and a user request that is a request by a user for connecting the external service to the service using node is detected, and the system acquires, from the service management system, connection information (information created by the service management system) for connection to the external service created by the service management system in response to the creation request. The service cooperation support system sets the acquired connection information in the property of the service using node.

According to a typical embodiment of the present invention, during editing of the flow of the visual programming system, the external service is dynamically created, and the connection information on the created external service is automatically set in the property of the service using node that invokes the external service. Accordingly, the user (for example, a developer) is not required to create the external service preliminarily, or manually set the connection information on the external service. As a result, application development can be efficient. Specifically, trial and error utilizing the flow including the service using node that invokes an external service can be performed at high speed. An example of the configuration and advantageous effects is clarified by the following description of embodiments.

BRIEF DESCRIPTION OF THE DRAWINGS

FIG. 2A is a diagram illustrating an example of a GUI screen of a visual programming system;

FIG. 2B is a diagram illustrating an example of operations for property setting;

FIG. 4 is a diagram illustrating an example of flow information;

FIG. 5 is a diagram illustrating an example of a data structure of various kinds of information in a service cooperation system;

FIG. 7 is a diagram illustrating an example of a data structure of a connection information list;

DESCRIPTION OF EMBODIMENTS

Figure 1:
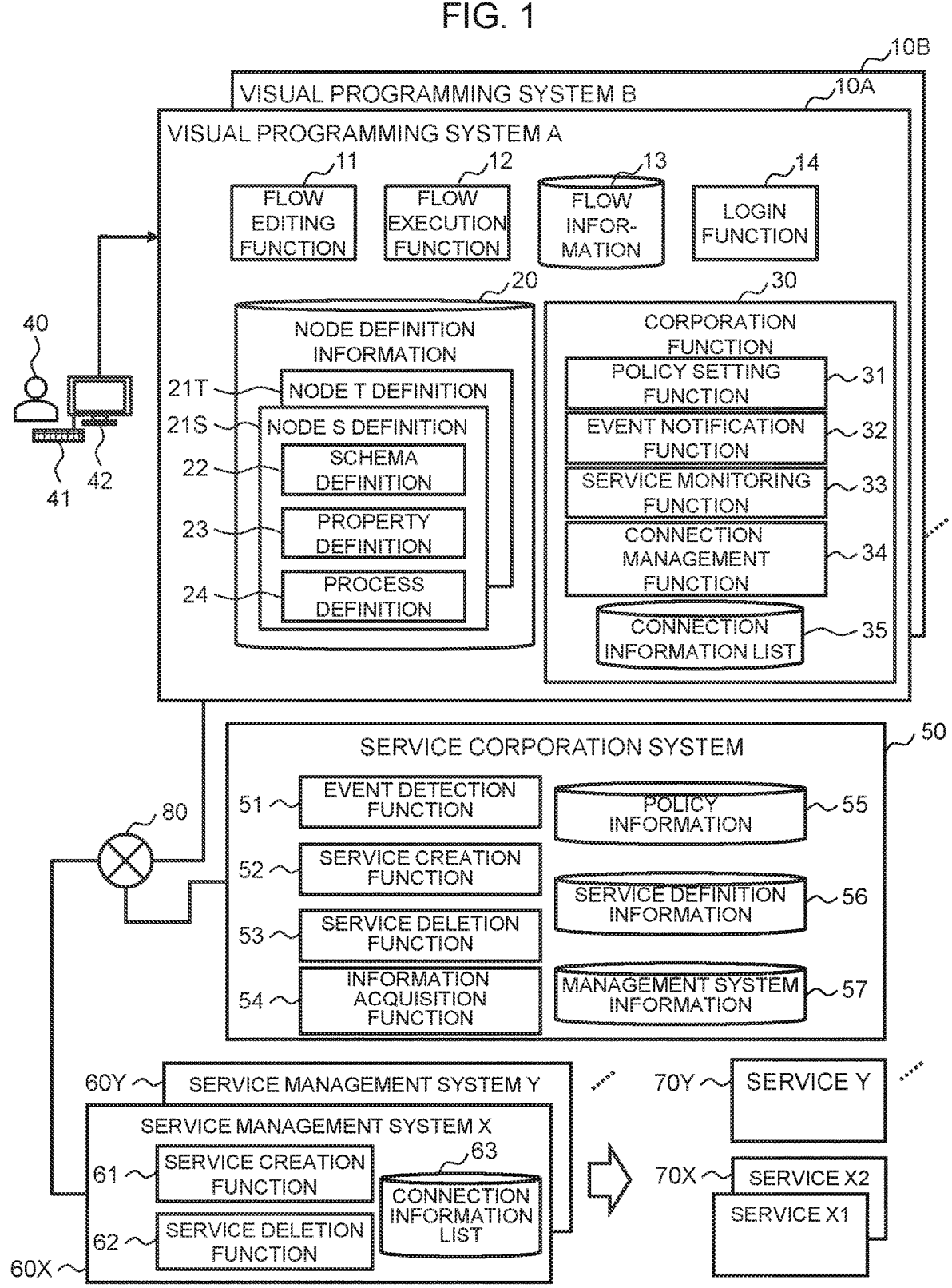
FIG. 1 is a block diagram showing an example of a system configuration in a first embodiment of the present invention.

Hereinafter, referring to the drawings, an embodiment of the present invention is described in detail.

However, the present invention is not limited to the embodiments described below. Various modified examples and equivalent configurations within the spirit of the accompanying claims are also encompassed. For example, these embodiments are detailed description for clearly illustrating the present invention. The present invention is not necessarily limited to what includes all the described configuration elements.

Note that in the following description, "interface apparatus" may be one or more interface devices. Each of the one or more interface devices may be at least one of devices below.

One or more Input/output (I/O) interface devices. Each Input/output (I/O) interface device is an interface device for at least one of an I/O device and a display computer at a remote site. The I/O interface device for a display computer may be a communication interface device. At least one of the I/O devices may be a user interface device, for example, any one of an input device such as a keyboard or a pointing device, and an output device such as a display device.

One or more communication interface devices. The one or more communication interface devices may be one or more communication interface devices (for example, one or more network interface cards (NICs)) of the same kind or may be a plurality of communication interface devices (for example, an NIC and a host bus adapter (HBA)) of different kinds.

In the following description, "memory" is one or more memory devices, and may be typically main storage devices. At least one of the memory devices of the memory may be a volatile memory device or a non-volatile memory device.

In the following description, "permanent storage apparatus" is one or more permanent storage devices. Each permanent storage device is typically a non-volatile storage device (for example, an auxiliary storage device), and specifically, for example, a hard disk drive (HDD) or a solid state drive (SSD).

In the following description, "storage apparatus" may be at least a memory among the memory and a permanent storage apparatus.

In the following description, "processor" is one or more processor devices. At least one of the processor devices is typically a microprocessor device such as a central processing unit (CPU), but may be a processor device of a different kind such as a graphics processing unit (GPU). At least one of the processor devices may include a single core or multiple cores. At least one of the processor devices may be a processor core. At least one of the processor devices may be a general processor device such as a hardware circuit (for example, a field-programmable gate array (FPGA) or an application specific integrated circuit (ASIC)) configured to perform part or all of processing.

In the following description, pieces of information are described as those in "table" or "JSON (JavaScript Object Notation) format text data" format (JavaScript is a registered trademark). These pieces of information are not necessarily represented in a data structure in a table. Alternatively, these pieces of information may be represented in a data structure such as a list, a DB or a queue, or text data such as data in a Yaml or XML format, or in another format. Accordingly, to indicate independency of a data structure, "table," "list," "DB," "queue" and the like may be simply referred to as "information." To describe the details of each piece of information, expression, such as of "identification information", "identifier" or "ID (Identification)" can be used. These can be replaced with each other.

In the following description, a process that starts to be executed by pressing a button on a GUI (Graphical User Interface) may start to be executed by invoking a corresponding API.

In the following description, information, such as programs, tables, and files, for achieving individual functions can be stored in a storage device, such as a memory, a hard disk or a SSD (Solid State Drive), or a recording media, such as an IC card, an SD card or a DVD.

In the following description, the configurations, functions, processing means and the like described above may be achieved as hardware by designing some or all of them in an integrated circuit, for example, or achieved as software by the processor analyzing and executing programs that achieve the functions.

In the following description, a function is sometimes described as expression "xxx function". The function may be achieved by a processor executing one or more computer programs, or may be achieved by one or more hardware circuits (for example, FPGA or ASIC). When the function is achieved by a processor executing a computer program, determined processing is performed by using a storage apparatus, an interface apparatus, and/or the like as appropriate, and thus the function may be at least part of the processor. Processing described with the function as a subject may be processing performed by a processor or an apparatus including the processor. The computer program may be installed from a program source. The program source may be, for example, a recording medium (for example, a non-temporary recording medium) readable from a program distribution computer or a computer. Description of each function is merely exemplary, and a plurality of functions may be collected as one function, or one function may be divided into a plurality of functions.

In the following description, when data is acquired or a function of a program is invoked between different computers, a remote procedure call using a communication protocol such as a web API is performed in actuality in some cases.

In the following description, to describe similar kinds of elements without discrimination from each other, common parts of reference signs are sometimes used. To discriminate similar kinds of elements from each other, reference signs are sometimes used. For example, not to discriminate visual programming systems from each other, the system is sometimes referred to as "visual programming system 10". To discriminate the visual programming systems from each other, the systems are sometimes referred to as "visual programming system 10A" and "visual programming system 10B".

First Embodiment

<Description of System>

FIG. 1 is a block diagram showing an example of a system configuration in a first embodiment of the present invention.

Visual programming systems 10, a service cooperation system 50, and service management systems 60 are coupled to a network 80.

In this embodiment, in conformity with policy information representing a policy set by a user 40 of the visual programming system 10, an external service (hereinafter, a service) 70 is created according to a certain event in the visual programming system 10. The created service 70 is allowed to be connectable from the visual programming system 10. Likewise, in response to the certain event in the visual programming system 10, the service 70 can be deleted and re-created. Furthermore, it is monitored whether the service 70 is usable or not. When the service 70 is unusable, execution of the flow of invoking the service 70 is made to stand by or is interrupted.

For one service cooperation system 50, a plurality of visual programming systems 10 and a plurality of service management systems 60 may be provided. For one service management system 60, a plurality of services 70 may be provided. One visual programming system 10 may be used by a plurality of users. A plurality of visual programming systems 10 may be used by one user. A connection mode of each component is not limited to the network. For example, the service cooperation system 50 may be provided in an individual visual programming system 10. The service management system. 60 may be provided in the service cooperation system 50.

The visual programming system 10 has a function of implementing and executing the flow. The flow is a program implemented using the visual programming system 10. The visual programming system 10 can use GUIs for implementing and executing the flow, and can output a GUI screen for editing the flow, to an output device 42. An example of a use image of the visual programming system 10 will be described in detail with reference to FIG. 2. The components in the visual programming system 10 will be described in detail after description with reference to FIG. 2.

The user 40 can program using the visual programming system 10. For programming, the user 40 views the GUI screen of the visual programming system 10 using the output device 42, such as a liquid crystal display, and can operate the GUI screen using an input device 41, such as a keyboard and a pointing device. A computer (not illustrated) of the user 40 may include the input device 41 and the output device 42, and communicate with the visual programming system 10.

The service cooperation system 50 has a function of creating and deleting the service 70 in response to an event notified from the visual programming system 10, and a function of notifying the visual programming system 10 of the connection information on the service 70.

Specifically, the service cooperation system 50 has an event detection function 51, a service creation function 52, a service deletion function 53, and an information acquisition function 54. The service cooperation system 50 manages policy information 55, service definition information 56, and management system information 57.

The event detection function 51 requests the service creation function 52 and the service deletion function 53 to create or delete the service 70, on the basis of the event transmitted from the visual programming system 10, and transmits the connection information on the service 70 to the visual programming system 10 after creation or deletion of the service 70. Specific processes of the event detection function 51 will be described in detail with reference to FIG. 8. The type and data format of the event will be described later.

Here, "connection information" is information required to operate the API of the service 70 via the network 80, and is, for example, information on an endpoint for access to the service 70, and authentication information for operating the service 70. The endpoint is, for example, a URL (Uniform Resource Locator) or an IP address (Internet Protocol) of the service 70. The authentication information represents, for example, a pair of a user account name and a password for passing the authentication of the service 70, or a character string, such as an access token or a certificate.

The service creation function 52 requests the service management system 60 to create the service 70. The service deletion function 53 requests the service management system 60 to delete the service 70. The processes of the service creation function 52 will be described in detail with reference to FIG. 9. The service deletion function 53 will be described in detail with reference to FIG. 10.

The information acquisition function 54 acquires the connection information on the service 70 from the service management system 60. The information acquisition function 54 is used by the connection management function 34 of the visual programming system 10.

The policy information 55 is information representing the use policy of each service 70 set by the user 40. The data structure of the policy information 55 will be described in detail with reference to FIG. 5.

The service definition information 56 is information for presenting a method of using the service 70 to the visual programming system 10 and the user 40. The service definition information 56 is created by, for example, a provider providing the service 70. The data structure of the service definition information 56 will be described in detail with reference to FIG. 5.

The management system information 57 is information for allowing the service cooperation system 50 to use the service management system 60. The data structure of the management system information 57 will be described in detail with reference to FIG. 5.

The service management system 60 has a function of creating or deleting the service 70 on the basis of the request issued by the service cooperation system 50, and a function of holding the connection information to the service 70. The service management system 60 may be a service creation system (ServiceBroker) that has an interface in conformity with the specifications of Open Service Broker, for example. Open Service Broker is specifications standardizing an interface of instructions for creating componentized services and exchanging setting values for using the services. Service management systems 60 may be provided respectively for the respective types of services 70, or respectively for companies that provide services. According to the example in FIG. 1, there are 60X and 60Y created by the service management system.

Here, "create the service 70" means that a person or a program operates the service 70 via the network 80 and achieves a state capable of using its function. In this embodiment, there are roughly two methods of creating the service 70. The first method issues an account of the service 70, then newly activates an instance for the account, activates a program that is an actual entity of the service 70, on the instance, and subsequently, associates the issued account with the activated instance with each other. The instance may be constructed by dedicated hardware, or may be on a computer or a virtual computer constructed on a computer using a virtualization technique or a container technique. The second method adds a new account to the service 70, and subsequently registers the account in the activated service 70.

"Delete the service 70" means, for example, at least one of the followings.

When corresponding account information is deleted from the service 70 and subsequently the service 70 individually creates an instance, the instance is stopped (in the case of a physical computer) or deleted (in the case of a virtual computer).

When the service 70 supports a plurality of accounts with one instance, data and setting information used by the account are deleted.

The service management system 60 has a service creation function 61, and a service deletion function 62. The service management system 60 manages a connection information list 63.

The service creation function 61 creates the service 70 using the method described above. The service deletion function 62 deletes the service 70 using the method described above.

The connection information list 63 holds the connection information on the created service 70 (for example, information including endpoint information and authentication information). Information that the connection information list 63 holds can be acquired via a web API and the like by the information acquisition function 54 of the service cooperation system 50. The data configuration of the connection information list 63 will be described in detail with reference to FIG. 7. Note that the connection information list 63 does not necessarily hold a Status field 704 illustrated in FIG. 7 (meanwhile, the connection information list 35 holds the Status field 704).

The service 70 is a program (instance) executed by one or more computers. The service 70 has a function of providing the function of a program for a person or another program via the network 80. The service 70 may be, for example, a database service or a speech recognition service. The person or the other program uses the function of the service 70 via a web API, for example. The service 70 holds endpoint information, such as an URL or an IP address, for access to the service 70 via the network 80, and the authentication information for determining whether the access source can use the service 70 or not. The endpoint information is sometimes different with respect to each user or instance, even though the service 70 is the same. For example, in FIG. 1, as for the service 70X, there are services X1 and X2 having endpoints different from each other.

<Description of GUI>

FIG. 2A is a diagram illustrating an example of a GUI screen of a visual programming system 10. Referring to FIG. 2, an example of an operation by the user 40 to use the visual programming system 10 is described.

A GUI screen 200 is an example of a GUI screen generated by a flow editing function 11 of the visual programming system 10. This GUI screen 200 is displayed on the output device 42. The user 40 uses this GUI screen 200 to set a policy for creating a flow, executing the flow, and using the service 70. The GUI screen 200 is an example of a flow editing screen.

The GUI screen 200 includes an execution button 201, user information UI 202, a node palette 210, an editing UI 220, a property setting UI 230, and a node description UI 234.

One or more nodes 211 (that can be elements of the flow 221) arrangeable on the editing UI 220 are displayed on the node palette 210. The node 211 represents an uninstantiated processing component among processing components visualized by icons or the like (for example, a program module that can become a software component). Definition information on the node 211 is stored in the node definition information 20.

The nodes 211 are roughly classified into input nodes for accepting an input from the outside, processing nodes for converting data into data in another format, and output nodes for output to the outside. The input nodes include, for example, a file reading node into which data is input from a file, an HTTP (Hyper Text Transfer Protocol) reception node for receiving an HTTP request, and a periodic execution node for periodically executing a flow at a time interval set by the user 40. The processing nodes include, for example, a service X using node that invokes the function of the service X via an API, an XML node that converts a value input in a format, such as of JSON, into the XML format, and a function node that executes any JavaScript function. The output nodes include, for example, a result saving node that saves data in a file, and an HTTP output node that returns an HTTP response.

The user 40 arranges the node 211 from the node palette 210, on the editing UI 220. Accordingly, the processing component represented by the node 211 is instantiated. The node 222 on the editing UI 220 represents an instantiated processing component. By connecting nodes 222 with lines 223, the flow 221 can be created. The flow 221 can be represented by a plurality of nodes 222, and lines 223 connecting the nodes 222. The processing component represented by the node 222 arranged on the flow 221 is assigned a unique node_id (a node ID represented by node_id 401 (FIG. 4)). As a result, the processing component is instantiated. Accordingly, the user 40 can arrange a plurality of nodes 222 representing processing components having the same node definition 21 (see FIG. 1) on the flow 221.

Connection between the nodes 222 is connection that allows an output of a certain node 222 to serve as an input of another node 222. The left end of the node 222 indicates the input, and the right end indicates the output. For example, on the flow 221, the output of the periodic execution node 222-1 serves as the input of the service X using node 222-2, and the output of the service X using node 222-2 serves as the input of another service X using node 222-3.

On the flow 221, based on the connection relationship between the nodes 222, the execution order of processes by a flow execution function 12 is determined. For example, after execution of the process of the periodic execution node 222-1, the process of the service X using node 222-2 is executed. For example, on the service X using node 222-2 or 222-3 (an example of the service using node), a status 224 of the node can be displayed. The presence or absence of the status display, details, and change in condition of each service using node are described in a schema definition 22 in the node definition 21, described later. The schema definition 22 is analyzed by the flow editing function 11, and the status of the service using node 222 is displayed.

When the user 40 selects the node 222 in the editing UI 220 using the input device 41, the flow editing function 11 updates information displayed on the property setting UI 230 and information displayed on the node description UI 234 to be information corresponding to the node 222. The user 40 can set the property of the selected node 222, via the property setting UI 230. The property setting UI 230 includes UIs 231 to 233. Note that "property" is a type of attribute of the node 222. One or more parameters are set in the property of the node 222. In the case where the node 222 is the periodic execution node 222-1, for example, the parameter value that can be set as a property value may be a value of an execution interval. The property value is different among node definitions 21. UIs that the property setting UI 230 includes may be GUI components (examples of components) used by a typical web application, such as text boxes, list boxes, and buttons. The property of the node 222 is set using such an UI.

The schema and use method of the node 222 arranged on the editing UI 220, and description of the property are displayed on the node description UI 234.

When the user 40 presses the execution button 201, the flow 221 is executed by the flow execution function 12. The process of executing the flow 221 will be described in detail in description with reference to FIG. 1 after description with reference to FIG. 2.

Profile information on the user 40 having logged in the visual programming system 10 (for example, an account name, and an attending project name), and an icon representing the user 40 are displayed on the user information UI 202.

Among nodes 222, there are nodes 222 that invoke the service 70 outside of the visual programming system 10 and uses the function of the service 70, such as the service X using nodes 222-2 and 222-3 described above. Such a nodes are referred to as "service using nodes". One service using node 222 operates a plurality of services 70 in some cases, and operates one service 70 in other cases. As with a data storing node and a data acquisition node, a plurality of types of nodes 222 exist for one service 70 in some cases (for example, a service Y learning execution node, and a service Y inference execution node). As described above, the correspondence relationship between the service using node 222 and the service 70 may be 1:1, 1:plurality, plurality:1, or plurality:plurality.

The property of the service using node 222 includes not only parameter items that the property of a normal node (a node other than the service using nodes) has, but also connection setting properties where the connection information on the service 70 and the policy of creating or deleting the service 70 are set. To set the connection setting property, the property setting UI 230 of the service using node includes a list box 231 for selecting the connection destination of the service using node, and a button 232 for designating that the connection setting is edited. One service using node may hold a plurality of connection setting properties.

Information representing the service specifications, such as the schema of the service 70 that the node uses and the charge type, may be displayed on the node description UI 234 in order to assist the user 40 to input the connection setting property of the service using node.

An activation verification node 211 may be provided as the node 211. The activation verification node 211 is a node that verifies whether all the services 70 that can be invoked at execution of the flow 221 after the activation verification node 211, during execution of this node 211, are accessible or not, and makes the execution of the flow 221 stand by or interrupts the execution if there is at least one inaccessible service 70. The activation verification node may be constructed as an input node or a processing node. The process of the activation verification node will be described in detail with reference to FIG. 12.

FIG. 2B is a diagram illustrating some examples of the property setting UI 230 for the service using node 222.

The property setting UI 230-1 is, for example, the initial property setting UI 230. When the user 40 selects the list box 231 using the input device 41, a connection setting list 235 that is a list of services 70 connectable to the service using node selected on the editing UI 220 is displayed by the flow editing function 11 (property selection UI 230-2).

In the connection setting list 235, the selectable connection setting is represented as a character string other than "NEWLY ADD," for example, "X1-9dbc4b3b" or "X1-c8dc722j". The character string representing the connection setting is an ID (for example, a combination of ServiceId and ResourceId, described later) representing the connection information on the service 70 having already been created by the user 40 (or a project to which the user 40 belongs), or any character string registered by the user 40 as a connection name 242 described later. The "service 70 that the user 40 (or the project to which the user 40 belongs) has already created" may be the service 70 corresponding to Credential 703 described later in conformity with the ID of the user 40 (or the ID of the user 40 and the ID of the project) in the connection information list 35, for example. Selection of the connection setting, such as "X1-9dbc4b3b" or "X1-c8dc722j", means use of the service having already been created with a changed endpoint, for example. Here, "connection setting" means setting of both the connection information on the service 70 and the policy information. Meanwhile, the item "NEWLY ADD" on the connection setting list 235 is selected when the user 40 intends to create newly the service 70.

When the user 40 presses the editing button 232 after selection of the existing connection setting from the connection setting list 235 or NEWLY ADD, one or more input items of connection setting are displayed on the property setting UI 230 by the flow editing function 11 (property selection UI 230-3).

Examples of one or more UIs respectively corresponding to one or more input items of connection setting include a connection name 242, an endpoint 243, authentication information 244, an automatic creation condition 245, an automatic deletion condition 246, a restart condition 247, and a custom policy 248. The user 40 inputs information via these UIs 242 to 248, and subsequently presses a setting button 240, thereby allowing new connection setting to be generated. For at least one of UIs 242 to 248, as input information, specific information (value) preset for the UI may be adopted when no specific input is made from the user 40. The user 40 can delete the existing connection setting by pressing the deletion button 241. Furthermore, to allow the user 40 to create or delete the service 70 manually, a manual creation button 249 and a manual deletion button 250 may be displayed on the property setting UI 230-3.

The connection name 242 is an input UI that accepts an input of the name of connection setting displayed on the connection setting list 235. The user 40 can set a name recognizable as a connection name. The initial value of the connection name 242 may be, for example, a combination of ServiceId and ResourceId, described later.

The endpoint 243 is an input UI of an endpoint (for example, an URL or IP address for access to the service 70) of the service 70. The authentication information 244 is an input UI of authentication information (for example, a combination of the account name and a password on the service 70, or access token information) for using the function of the service 70. The endpoint and the authentication information are automatically set during creation of the service 70, in this embodiment. Note that the user 40 may be allowed to input these pieces of information manually.

The automatic creation condition 245 is an input UI that accepts an input of the creation condition that is a condition for automatically creating the service 70. Setting of the creation condition automatically allows the service 70 to be created at timing when the user 40 requires the service 70, and allows the connection information on the service 70 to be set in the property of the service using node.

The automatic creation condition 245 is, for example, a list box that displays a list of creation conditions. Selectable creation conditions include, for example, at adding connection setting, at node use, at service invocation, and OFF. These creation conditions correspond to events of the event notification function 32, described later. A specific creation condition, such as "at node use" can be set as an initial value, in the automatic creation condition 245. Accordingly, even without the user 40 manually inputting the creation condition (at least a part of the policy), the service 70 is automatically created at timing when the service 70 is required.

"At adding connection setting" means the timing when the user 40 presses the setting button 240 and the connection setting is added to the connection setting list 235. "At node use" means the timing when the execution button 201 of the flow is pressed in a state where the service using node using the connection setting is a configuration element of the flow 221. "At service invocation" means the timing when the process of the service using node is executed and the visual programming system 10 actually accesses the service 70. "OFF" means that the service 70 is not automatically created. Note that in a case where it is obvious that the service using node is not executed even if being arranged on the editing UI 220, such as a case where the service using node is solely provided without any input node "at node use", the timing is not necessarily regarded as the timing that is "at node use".

According to "at adding connection setting," the service 70 is created before execution of the flow 221. Accordingly, it is not required to wait for creation of the service 70 at flow execution. On the other hand, in a case where the usage fee of the service 70 is charged on a pay-per-use basis according to the time length during which the service 70 is in a usable state, there is a possibility that the usage fee of the service 70 occurs even in a stage where the flow 221 is being created (in other words, if the service 70 is not actually used but is in a usable state). The creation timing of the service 70 is different between "at node use" (in other words, "at flow execution") and "at service invocation". Accordingly, for example, if the service using node is implemented in the flow 221 but this service using node is rarely executed because it is behind conditional branching and the like, selection of "at service invocation" can avoid unnecessary activation of the service 70. On the other hand, in a case where creation of the service 70 takes time, the process of the flow 221 is stopped until the service 70 is created. Accordingly, in such a case, it is considered that "at adding connection setting" or "at node use" is preferably selected.

The automatic deletion condition 246 is an input UI that accepts an input of the deletion condition that is a condition for automatically deleting the service 70. By setting the deletion condition, the service 70 is automatically deleted at timing when the service 70 becomes unnecessary for the user 40. As a result, it can be expected that charging of the unnecessary service 70 is avoided and the storage capacity to be consumed is reduced.

The automatic deletion condition 246 is, for example, a list box that displays a list of deletion conditions. Selectable deletion conditions include, for example, at apparatus stop, at connection setting deletion, at node deletion, at invocation completion, and OFF. These deletion conditions correspond to events of the event notification function 32, described later. A deletion condition, such as "at node deletion", can be set as an initial value, in the automatic deletion condition 246. Accordingly, even without the user 40 manually inputting the deletion condition (at least a part of the policy), the service 70 is automatically deleted at timing when the service 70 becomes unnecessary.

"At apparatus stop" means timing when the visual programming system 10 is stopped. "At connection setting deletion" means timing when the deletion button 241 is pressed by the user 40 and the flow is executed in a state where the corresponding connection setting is deleted. "At node deletion" means timing when all the service using nodes using the connection setting are deleted. "At invocation completion" means timing when invocation of the service 70 from the service using node is completed. "OFF" means that the service 70 is not automatically deleted.

The restart condition 247 is an input UI for accepting an input of a restart condition that is a condition of a behavior when the visual programming system 10 detects an abnormality of the service 70. By setting the restart condition, the user 40 can select a behavior such that the service 70 is automatically re-created when the service 70 comes into an abnormal state, or the service 70 is refrained from being re-created in case the service 70 comes into an abnormal state, treating the protection of the data in the service 70 as a priority. Here, re-creation means that the service 70 is once deleted and is created anew. Note that in a case where a process resulting in resolving abnormalities of the service 70 is included, such as re-creation or instance reactivation, as the function of the service 70, this function may be executed.

The restart condition 247 is, for example, a list box that displays a list of restart conditions. Selectable restart conditions include, for example, Always, Conform to automatic creation condition, and OFF. "Always" means that the service 70 is always re-created when an abnormality of the service 70 is detected. "Conform to automatic creation condition" means that when an abnormality of the service 70 is detected, deletion of the service 70 is only performed, and subsequent re-creation conforms to the set automatic creation condition. "OFF" means automatic restart (automatic deletion and re-creation) of the service 70 is not executed.

The custom policy 248 is an input UI that accepts an input of an individual policy for each service 70. That is, as for the service using node, the policy includes at least a common policy between the common policy independent of the service to be connected, and an individual policy dependent of the service to be connected. The individual policy may be, for example, a charge plan. Instead of or in addition to the charge plan, for example, a data center of a creation destination of an instance of the service, the capacity of computer resources to be allocated to the service and the like may be adopted as the individual policy. The custom policy 248 is not necessarily present. Alternatively, a plurality of custom policies 248 may be present. A provider of the service 70 registers input items that the custom policy 248 accepts, as CustomPolicy 511 of the service definition information 56, for example. The flow editing function 11 analyzes the CustomPolicy 511, and generates the custom policy 248. The data structure of the CustomPolicy 511, and the method of generating the custom policy 248 will be described in detail with reference to FIGS. 5 and 6.

<Description of System (Cont.)>

The description is returned to that with reference to FIG. 1.

The visual programming system 10 has a flow editing function 11, a flow execution function 12, a login function 14, and a cooperation function 30. The visual programming system 10 manages flow information 13, and node definition information 20.

The flow editing function 11 provides the GUI screen 200. In response to a user operation to the GUI screen 200, this function generates, changes or deletes the flow, or invokes the flow execution function 12. The flow editing function 11 analyzes the node definition 21 in the node definition information 20, described later, and determines display of each of the node palette 210, the property setting 230, and the node description 234. According to a second embodiment described later, the flow editing function 11 may be provided as a web application, for the user 40. The configuration example of the system including the flow editing function as a web application will be described in detail with reference to FIG. 14.

Upon receipt of the request issued by the flow editing function 11, the flow execution function 12 analyzes and executes the flow 221. The analysis of the flow 221 includes: analyzing the flow information 13; and recognizing the type of the nodes 222 constituting the flow 221 represented by the flow information 13, the properties, and the connection relationship. The execution of the flow 221 includes: finding the aforementioned input node in the flow 221; and executing the program of the process definition 24 of the nodes 222 sequentially along the connections of the nodes 222 from the input node. In a case where the input node is periodically executed or a case where the process is executed based on another input, such as acceptance of an HTTP request, a series of flows connected to the input flow is executed every time. The specifications of the program of the process definition 24 will be described later.

The flow information 13 is data that is the actual entity of the flow 221. The flow information 13 is described in JSON, for example. The flow information 13 includes information representing all the nodes in the flow 221, information representing the property of each node, and information representing the connection relationship between nodes. An example of the data structure of the flow information 13 will be described in detail with reference to FIG. 4.

The login function 14 presents a login screen to the user 40, and manages profile information that includes information representing the account name, the attending project, and an icon representing the user 40, after login. The profile information is displayed on the user information UI 202 on the GUI screen 200 by the flow editing function 11.

The node definition information 20 includes the node definition 21 that is the definition of each node 211. The node definition 21 is present for each of nodes, such as the periodic execution node and the service X using node, and is described in formal languages and programming languages, such as HTML and JavaScript, for example. The node definition 21 includes the schema definition 22, a property definition 23, and the process definition 24. In the following description of the node definition 21, hereinafter, one node is exemplified ("node of interest" in the description with reference to FIG. 1).

The schema definition 22 is information representing the schema of the node of interest, for example. The schema definition 22 includes, for example, information representing the name of the node of interest, information representing the type of the node of interest (for example, "processing node"), node description information representing the display content of the node description 234, and information representing the status definition of the node of interest. The node description information may be text data on a text to be displayed, or information representing a result of execution of a specific program. The status definition of the node of interest may be a program that displays a specific character string as a status when a specific condition is satisfied according to use of conditional branching. The program is executed only once at timing when the node 211 of interest is arranged on the editing UI 220. If a periodic execution process is described in the program, the status can be periodically updated.

The property definition 23 of the node of interest represents the data structure of the property, and the definition of a program for constructing the property setting UI 230.

The process definition 24 represents the definition of a program of a process to be executed by the node of interest in the flow 221 during execution of the flow 221. The program of the process definition 24 can receive and output data in a hashmap format, such as an object format of JavaScript, for example. The data output by this process serves as an input value of a node connected to the output side of the node of interest in the flow 221. In the program of the process definition 24, the value of the property set by the property setting UI 230 can be used as a variable.

Here, an example of characteristics of the node definition 21 of the service using node is described. Information displayed on the node description UI 234 with respect to the service using node may be a return value of a node description acquisition process executed by a policy setting function 31. The value of the status definition may be the value of Status 704 of a record corresponding to the connection information list 35 (see FIG. 7). The corresponding record is a record having a ResourceId 700 identical to the ResourceId in the connection setting property. The property definition 23 includes the connection setting property, and a ServiceId property. The input UI of the connection setting property is generated by the invoked policy setting function 31, for example. ServiceId has no input UI. This is because ServiceId is prevented from being changed by the user 40. When the service 70 is invoked, the process definition 24 executes a connection information acquisition process, with ResourceId being adopted as an argument to the connection management function 34, and invokes the service 70 based on the connection information acquired as a return value thereof.

The cooperation function 30 invokes the service cooperation system 50 from the visual programming system 10, manages the connection information on the service 70, and monitors the state of the service 70. The cooperation function 30 has a policy setting function 31, an event notification function 32, a service monitoring function 33, and a connection management function 34. The cooperation function 30 manages the connection information list 35.

The policy setting function 31 generates the node description UI 234 of the service using node and the property setting UI 230, adds or deletes a value to the policy information 55 or from the policy information 55 in response to a user operation for the property setting UI 230, and transmits, to the event notification function 32, an event representing creation or deletion of the service when the manual creation button 249 or the manual deletion button 250 is pressed.

For example, the policy setting function 31 acquires, from the policy information 55, all the records having ServiceId 501 coinciding with ServiceId of the service using node, and includes the value of Name 503 of each of the acquired records in the connection setting list 235.

For example, during generation of the property setting UI 230-3, the policy setting function 31 generates input UIs other than the custom policy 248, subsequently acquires, from the service definition information 56, records having ServiceId 510 coinciding with the ServiceId of the service using node, analyzes CustomPolicy 511 in each of the records, and generates an input UI of the custom policy 248. "Analyze" CustomPolicy 511 may be, for example, generation of a text box when "type" of each policy setting item in CustomPolicy 511 is "string" or "number", generation of a checkbox when "type" is "Boolean", and generation of a list box having item values defied in "enum" when "type" has not only "string" and "number" but also "enum". Such a process is repeated as many times as the number of policies in CustomPolicy 511.

For example, the policy setting function 31 displays, in the node description UI 234, the values of Overview 513, Charges 514 and CustomDescription 515 in the record having ServiceId 510 coinciding with ServiceId in the service definition information 56. When "description" of the custom policy is defined in CustomPolicy 511 of the record, the value of "description" may be additionally displayed in the node description UI 234.

When the user 40 presses the setting button 240, the policy setting function 31 adds a record where the property setting UI 230 includes ResourceId and a unique value is added in the service cooperation system 50 and the value is included, as a new record, in the policy information 55. When the deletion button 241 is pressed and the existing connection setting is deleted, the policy setting function 31 deletes the record having ResourceId 500 coinciding with ResourceId for a deletion target, in the policy information 55. For example, when the connection setting is added or deleted, the policy setting function 31 notifies the event notification function 32 of an event representing "add connection destination" or "delete connection destination" after the process described above.

The event notification function 32 notifies the service cooperation system 50 of occurrence of a specific process in the visual programming system 10, as an event. Beginning at the event, the service cooperation system 50 creates or deletes the service 70. Various programs (various types of functions) in the visual programming system 10 may explicitly notify the event notification function 32 of occurrence of the event. Alternatively, the event notification function 32 may detect occurrence of the event by monitoring the state of various programs.

The events may include, for example, add connection setting, delete connection setting, use node, delete node, invoke service, completion of service invocation, apparatus stop, forcibly create, and forcibly terminate.

"Add connection setting" is an event that occurs when the setting button 240 is pressed, and is an event that represents pressing of the setting button 240. "Delete connection setting" is an event that occurs when the deletion button 241 is pressed, and is an event that represents pressing of the deletion button 241. "Use node" is an event that occurs when the flow execution button 201 is pressed, and is an event that represents that the flow 221 includes the service using node where the connection information on the service 70 having not been set in the property when the flow execution button 201 is pressed. "Delete node" is an event that occurs when the flow execution button 201 is pressed, and is an event that represents that the connection information having not been used in the flow 221 is present in the connection information list 35 when the flow execution button 201 is pressed.

"Invoke service" is an event that occurs when the flow 221 is executed, and is an event that represents that the visual programming system 10 accesses the service 70 by the process of the service using node in the execution of the flow 221. "Completion of service invocation" is an event that occurs when the flow 221 is executed, and is an event that represents completion of the access from the visual programming system 10 to the service 70. "Apparatus stop" is an event that occurs when the program of the flow editing function 11 or the flow execution function 12 is stopped, and is an event that represents stop of the flow editing function 11 or the flow execution function 12.

"Forcibly create" is an event that occurs at pressing of the manual creation button 249 or at the restart process in the service monitoring function 33, and is an event that represents that the service is forcibly created. "Manual termination" is an event that occurs at pressing of the manual deletion button 250 or at the restart process in the service monitoring function 33, and is an event that represents manual deletion of the service.

Event notification that is data to be transmitted by the event notification function 32 to the service cooperation system 50 when the event occurs is, for example, JSON format data and includes "event", "serviceId" and "resourceId".

"Event" represents the name or identifier of the occurring event. Specifically, "event" represents the type of event, such as "add connection setting" described above. "Event" may include a character string, such as add connection setting, or an identifier of the type of the event. "Event" may include information representing the event occurrence cause.

"ServiceId" represents the identifier of the service 70 serving as an event target, and may include, for example, the value of ServiceId that the property of the service using node has, and the value of ServiceId 701 in the connection information list.

"ResourceId" represents ResourceId of the connection setting or the connection information that pertain to the event. For example, "resourceId" may include ResourceId that the connection setting of the service using node having issued the event has, and the value of ResourceId 700 of the connection information where an abnormality is detected by the service monitoring function 33. When a plurality of ResourceId serving as targets are present, an event is issued for each ResourceId.

The service monitoring function 33 detects completion of creation and abnormality of the service 70 by periodically performing a process of monitoring the service 70, and updates Status 704 of the connection information list 35 illustrated in FIG. 7. When the abnormality of the service 70 is detected, the service monitoring function 33 issues a request of reacquisition of connection information on the service 70 to the connection management function 34. If an abnormality is detected even after this, the service 70 is reactivated according to the policy information 55. The reacquisition of the connection information and the restart process are described in detail with reference to FIG. 13.

The service monitoring function 33 allows the user 40 to grasp the status of the service 70 from the GUI screen 200. In case the service 70 cannot be used owing to non-activation or an error (including an error in a case without network accessibility other than the error of the service 70), the process of the service using node or the activation verification node can be prevented from being stopped by the connection management function 34. An error can be prevented from occurring in the flow 221 executed in an inaccessible state. Furthermore, the user 40 is not required to reactivate manually the service 70 in case of an error of the service 70.

The service monitoring function 33 regards the service 70 having the connection information included in the connection information list 35 as a monitoring target. The statuses of the service 70 include, for example, "Pending" that means a state where no service 70 is created, "Provisioning" means that the service 70 is being created, "Running" that means that the service 70 is running, and "Error" that means that abnormality occurs.

Here, an example of a specific operation of detecting the status of the service 70 by the service monitoring function 33 is described. When the service monitoring function 33 detects that new connection information is added to the connection information list 35, the value of Monitoring 512 of the record having ResourceId 700 identical to ResourceId of the connection information is acquired from the policy information 55. Subsequently, the service monitoring function 33 executes the process of monitoring the service 70 on the basis of the details of Monitoring 512 according to the method illustrated in FIG. 6. In conformity with the response of the process of monitoring the service 70, the service monitoring function 33 registers the status detected by the monitoring process as Status 705 corresponding to the service 70.

Here, "monitoring process" means a process of accessing the URL where the service 70 is designated, every certain time, and checking whether a correct response is returned or not. "Correct response" may mean, for example, an HTTP response having any of HTTP status codes of 200s. Note that a monitoring process for the service 70 that does not support HTTP may check whether a response from an endpoint designated by TCP, UDP, ICMP or the like is returned or not. If no response is returned in the monitoring process, the service monitoring function 33 may request the connection management function 34 to reacquire connection information, and execute the monitoring process anew after the connection information is updated. Specifically, for example, if no response is returned or an error is returned from the service 70, the service monitoring function 33 may acquire ResourceId of the service 70 from the connection information list 35, requests the connection management function 34 to reacquire the connection information, with this ResourceId being adopted as an argument, and execute the monitoring process anew after acquisition of the completion notification.

The connection management function 34 creates, changes, and deletes the connection information list 35, and transmits the connection information to the service using node. This function 34 negates the need of management of the connection information by the user 40, and manual connection information setting for the service using node, thereby reducing the load on the user 40.

Based on a notification from the service cooperation system 50, the connection management function 34 adds the connection information on the created service 70 to the connection information list 35, and deletes the connection information on the deleted service 70 from the connection information list 35. This process will be described in detail with reference to FIG. 8.

The connection management function 34 receives a request issued by the service monitoring function 33, and reacquires the connection information on the service 70. Specifically, for example, when the connection management function 34 is requested by the service monitoring function 33 to reacquire the connection information on the service 70 with ResourceId 700 of the target service 70 being adopted as an argument, this function 34 requests the information acquisition function 54 to acquire the connection information on ResourceId 700. The connection management function 34 updates the values of Endpoint 702 and Credential 703 of the record where ResourceId 700 on the connection information list 35 coincides, through the connection information acquired as the response, and returns a reply to the service monitoring function 33.

Upon acceptance of a request for acquiring the connection information on the service 70 from the service using node with ResourceId being adopted as an argument, the connection management function 34 acquires the record having ResourceId 700 coinciding with the ResourceId of the argument, from the connection information list 35. When Status 704 in the record is "Running", the connection management function 34 passes the values of Endpoint 702 and Credential 703 in the record, as return values, to the service using node. When Status 704 in the record is "Error", the connection management function 34 notifies the service using node of Error. When Status 704 in the record is neither "Running" nor "Error", the connection management function 34 waits for a response for a certain time until Status 704 becomes "Running". This process will be described in detail with reference to FIG. 11.

The connection information list 35 holds the connection information on the service 70. The data structure of the connection information list 35 will be described in detail with reference to FIG. 7.

<Hardware Configuration>

Figure 3:
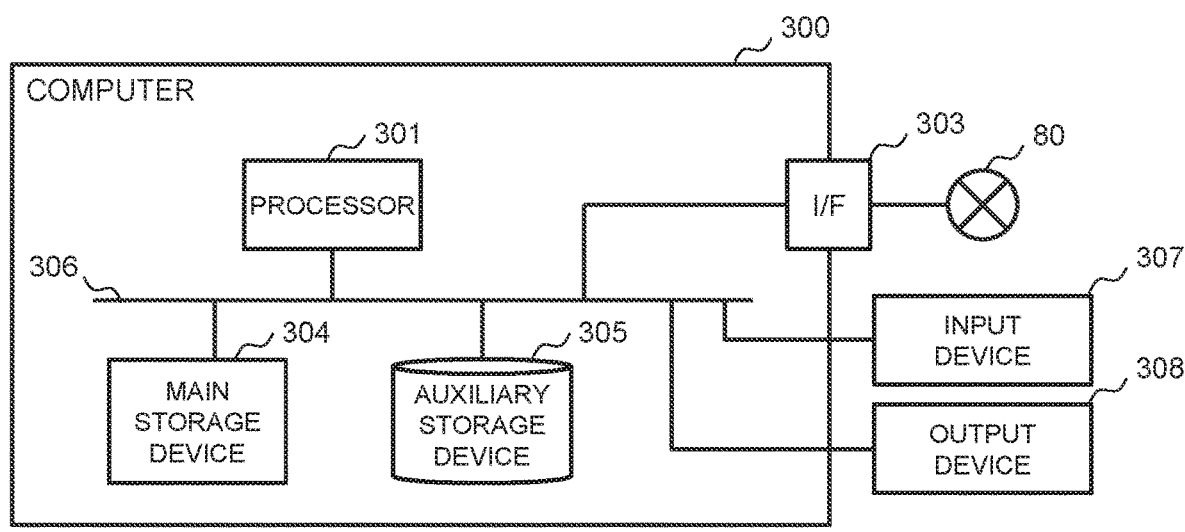
FIG. 3 is a block diagram showing an example of a hardware configuration of a computer.

FIG. 3 is a block diagram showing an example of a hardware configuration of a computer.

The computer 300 is an example of a configuration element of an execution platform of at least one of the visual programming system 10, the service cooperation system 50, the service management system 60, and the service 70. That is, at least one of the visual programming system 10, the service cooperation system 50, the service management system 60, and the service 70 can be achieved based on one or more computers 300. Note that the execution platform may be a single computer, or a system including a plurality of computers, such as a cloud platform. At least one of the visual programming system 10, the service cooperation system 50, the service management system 60, and the service 70 may be achieved on a physical computer, such as the computer 300, but may be achieved on a virtual computer instead. The flow information 13, the node definition information 20, the connection information list 35, the policy information 55, the service definition information 56, the management system information 57 and the connection information list 63 may be stored in one or more storage apparatuses. At least one of the one or more storage apparatuses may reside in any execution platform, or may be an external storage apparatus with which the execution platform can communicate.

In FIG. 3, the computer 300 is provided with a processor 301, a communication interface device 303, a main storage device 304, and an auxiliary storage device 305. The processor 301, the communication interface device 303, the main storage device 304, and the auxiliary storage device 305 are coupled to each other via an internal bus 306.

An input device 307 and an output device 308 may be provided as human interfaces of the computer 300. The input device 307 and the output device 308 may be coupled to the internal bus 306.

The processor 301 is hardware that administers operation control of the entire computer 300. The main storage device 304 includes, for example, a semiconductor memory, and holds various programs and data. Specifically, for example, the main storage device 304 of the visual programming system 10 can hold one or more programs for achieving the flow editing function 11, the flow execution function 12, the login function 14 and the cooperation function 30, and the flow information 13 and the node definition information 20. The main storage device 304 of the service cooperation system 50 can hold one or more programs for achieving the event detection function 51, the service creation function 52, the service deletion function 53 and the information acquisition function 54, and the policy information 55, the service definition information 56 and the management system information 57. The main storage device 304 of the service management system 60 can hold one or more programs for achieving the service creation function 61 and the service deletion function 62, and the connection information list 63.

The auxiliary storage device 305 is a storage device having a large amount of storage capacity, and for example, a HDD (Hard Disk Drive) or a SSD (Solid State Drive). The auxiliary storage device 305 holds execution files of various programs. The main storage device 304 and the auxiliary storage device 305 are accessible from the processor 301.

<Data Structure>

FIG. 4 shows an example of the data structure of the flow information 13.

The flow information 13 is a JSON format data, for example. However, the flow information 13 may be data having another data structure, such as of XML or YAML.

The flow information 13 includes a block of a node setting 400 for each node in the flow 221. One node is exemplified ("node of interest" in the description with reference to FIG. 4).

The node setting 400 includes: a nodeId 401 that represents an identifier for uniquely identifying the node of interest on the flow; a nodeType 402 that represents a type of node (for example, corresponding to an object-oriented class); a nodeName 403 that represents the display name of the node of interest on the GUI screen 200; properties 404 that represent the value set as the property of the node of interest; coordinates 405 that represent the coordinates of the display position of the node of interest on the GUI screen 200; and wires 406 that represent the connection relationship between the node of interest and another node.

When the node of interest is the service using node, properties 404 include resourceId 407 that represents resourceId of the connection setting associated with the service using node. The service using node can acquire the connection information on the corresponding service 70 from the connection management function 34, with the resourceId 407 being adopted as an argument.

FIG. 5 is a diagram illustrating an example of the data structure of various types of information that the service cooperation system 50 has.

Each of the policy information 55, the service definition information 56, and the management system information 57 is a table, for example.

The policy information 55 includes, for example, a record for each policy of the service 70. Each record includes information such as a ResourceId 500, a ServiceId 501, a ProjectId 502, a Name 503, a Provision 504, a Delete 505, a Restart 506, and a CustomPolicy 507. One record of the policy information 55 corresponds to the policy of the connection setting. With respect to one flow, for example, a plurality of service using nodes refer to one policy. Hereinafter, one policy, and service using nodes that use the policy are exemplified ("policy of interest" and "nodes of interest" in the description with reference to FIG. 5).

The ResourceId 500 corresponds to the identifier of the policy of interest, and is the ResourceId of the node of interest. The ServiceId 501 represents the identifier of the provisioned service 70 with respect to the node of interest. Note that "provisioned service 70" means a service 70 where the connection information has not been set yet in the property of the node of interest but the connection information is scheduled to be set, or a service 70 where the connection information has already been set in the property of the node of interest. The ProjectId 502 represents the identifier of the project to which the user 40 having set the policy of interest belongs. The Name 503 represents the connection name input by the user 40, and is used to display the connection setting list 235 and the property setting UI 230-3. The Provision 504 is an automatic creation condition of the provisioned service 70. The Delete 505 is an automatic deletion condition of the provisioned service 70. The Restart 506 is a restart condition of the provisioned service 70. The CustomPolicy 507 is a setting value of the custom policy in the policy of interest. The CustomPolicy 507 is represented in the JSON format, for example, but may be in another data structure, such as of XML or YAML.

The service definition information 56 includes, for example, a record for each service 70. Each record includes information such as the ServiceId 510, the CustomPolicy 511, the Monitoring 512, the Overview 513, the Charges 514 and the CustomDescription 515. Information on each record of the service definition information 56 is input by a provider of the service 70 corresponding to the record, for example. One service 70 is exemplified ("service 70 of interest" in the description with reference to FIG. 5).

The ServiceId 510 represents the identifier of the service 70 of interest. The CustomPolicy 511 represents the definition of the custom policy of the service 70 of interest. The details of the CustomPolicy 511 will be described with reference to FIG. 6. The Monitoring 512 represents the definition of the process of monitoring the service 70 of interest. The details of the Monitoring 512 will be described with reference to FIG. 6. The Overview 513 represents a schema displayed on the node description UI 234 for the service 70 of interest. The Charges 514 represents the charge type displayed in the node description UI 234 for the service 70 of interest. The CustomDescription 515 represents individual description displayed in the node description UI 234 for the service 70 of interest (for example, description items individually set by the provider of the service 70). The CustomDescription 515 is represented in the Markdown format, for example, but may have another data structure, such as of an HTML format or a plain text, instead.

One value of at least one of the CustomPolicy 511, the Monitoring 512, the Overview 513, the Charges 514 and the CustomDescription 515 may be void.

The management system information 57 includes, for example, a record for each service management system 60. Each record includes information, such as a SystemId 520, an Endpoint 521, a Credential 522 and a Services 523. Hereinafter, one service management system 60 is exemplified ("interest management system 60" in the description with reference to FIG. 5).

The SystemId 520 represents the identifier of the interest management system 60. The Endpoint 521 represents an endpoint (for example, a URL or an IP address) for access to the interest management system 60. The Credential 522 is authentication information on the interest management system 60 (for example, a combination of the account name and the password). The Services 523 represent a list of ServiceId of services 70 that can be created or deleted from the interest management system. The Services 523 are represented in the JSON format, for example, but may be in another data structure, such as of XML or YAML.

Figure 6:
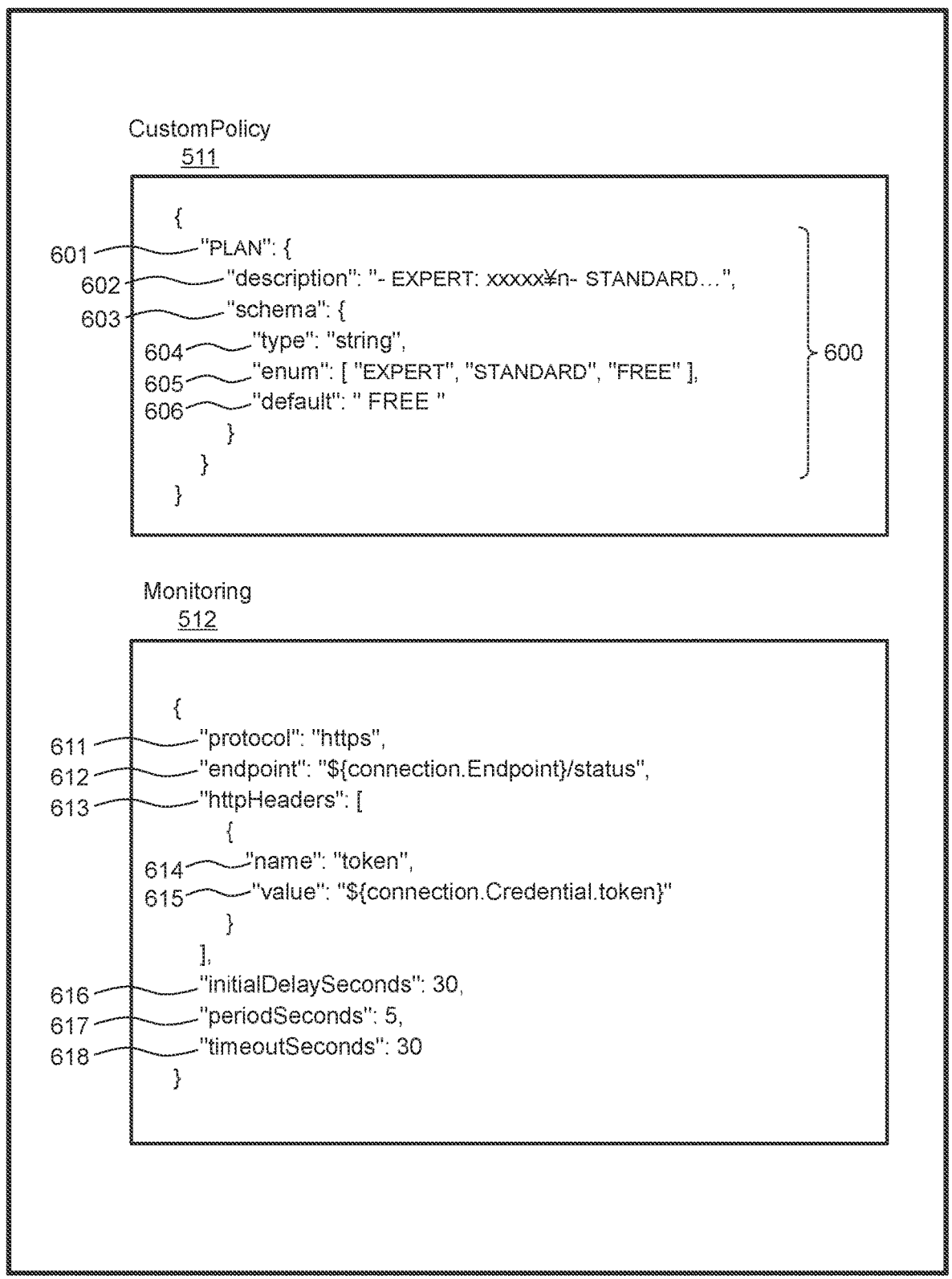
FIG. 6 is a diagram illustrating an example of data structures of CustomPolicy and Monitoring in service definition information.

FIG. 6 is a diagram illustrating an example of data configurations of the CustomPolicy 511 and the Monitoring 512 in the service definition information 56.

As described above, the CustomPolicy 511 represents the definition of the custom policy, and the Monitoring 512 represents the definition of the monitoring process. These are represented in the JSON format, for example, but may be in another data structure, such as of XML or YAML.

The CustomPolicy 511 includes an item definition 600 for each setting item of the custom policy. The item definition 600 includes, for example, a name 601 that represents the name of the setting item, a description 602 that represents the description of the setting item, and a scheme 603 that represents the data structure of the setting item. The scheme 603 includes, for example, a type 604 that represents a data type, an enum 605 that is a value allowed to be input as data, and a default 606 that represents an initial value.

The description 602 is represented in the Markdown format, for example, but may have another data structure, such as of an HTML format or a plain text. When the description 602 is set, the value is displayed, as the description of the custom policy, in the node description UI 234. The values of the type 604 include, for example, "string" that means a character string, "number" that means a numeric value, and "Boolean" that means a logic value. The description 602, the enum 605 and the default 606 are not necessarily included. When there is no custom policy, the CustomPolicy 511 may be void.

The Monitoring 512 includes, for example, a protocol 611 that represents a communication protocol of communication for monitoring, an endpoint 612 that is an endpoint of a monitoring target (for example, a URL or an IP address), an httpHeaders 613 that represents an HTTP header to be set in monitoring communication that is communication for monitoring, an initialDelaySeconds 616 that represents a time during which the initial monitoring communication is waited after creation of the service 70 in consideration of the activation time of the service 70, a periodSeconds 617 that represents an execution interval of the monitoring process, and a timeoutSeconds 618 that represents a timeout time of response to the monitoring communication. In the httpHeaders 613, the items of the HTTP header are set as a list. Each item includes a name 614 that is a header name, and a value 615 that is a value.

In the Monitoring 512, the value of the connection information list 35 can be used as the connection variable. In the case of use, the field name of the connection information list 35 may be designated after "connection.". For example, if "connection.Endpoint" is assumed, the value of the Endpoint 702 of the record that represents the service 70 serving as the monitoring target in the connection information list 35 can be used. The variable is embedded in a character string in a format identical to that when the variable is used in a template literal of JavaScript, for example. Each item is not necessarily included. In such a case, a default setting value defined in the service monitoring function may be used.

The service monitoring function 33 performs a monitoring process including processes of communicating with the monitoring target represented by the endpoint 612 using a protocol represented by the protocol 611 and of verifying the return value, at a time interval represented by the periodSeconds 617. When the protocol 611 represents http or https, the value of the httpHeaders 613 is used as the HTTP header. Note that after creation of the service 70, the initial communication stands by for a time represented by the initialDelaySeconds 616, and subsequently monitoring communication is performed. If the reply of communication is not returned in at least a time represented by timeoutSeconds 618 (or if the status code of the reply of communication is that other than predetermined numbers in a case of HTTP or HTTPS), the service monitoring function 33 determines that an abnormality is in the service 70.

FIG. 7 illustrates an example of the data structure of the connection information list 35.

The connection information list 35 is a table, for example. The connection information list 35 includes, for example, a record for each piece of connection information on the service 70. Each record includes the ResourceId 700 that is ResourceId corresponding to the identifier of connection information, the ServiceId 701 that represents the identifier of the service 70, the Endpoint 702 that represents the endpoint of the service 70, the Credential 703 that is authentication information on the service 70, and the Status 704 that represents the status of the service 70. In each record, the Endpoint 702 and the Credential 703 correspond to the connection information in this embodiment.

<Various Processes>

Figure 8:
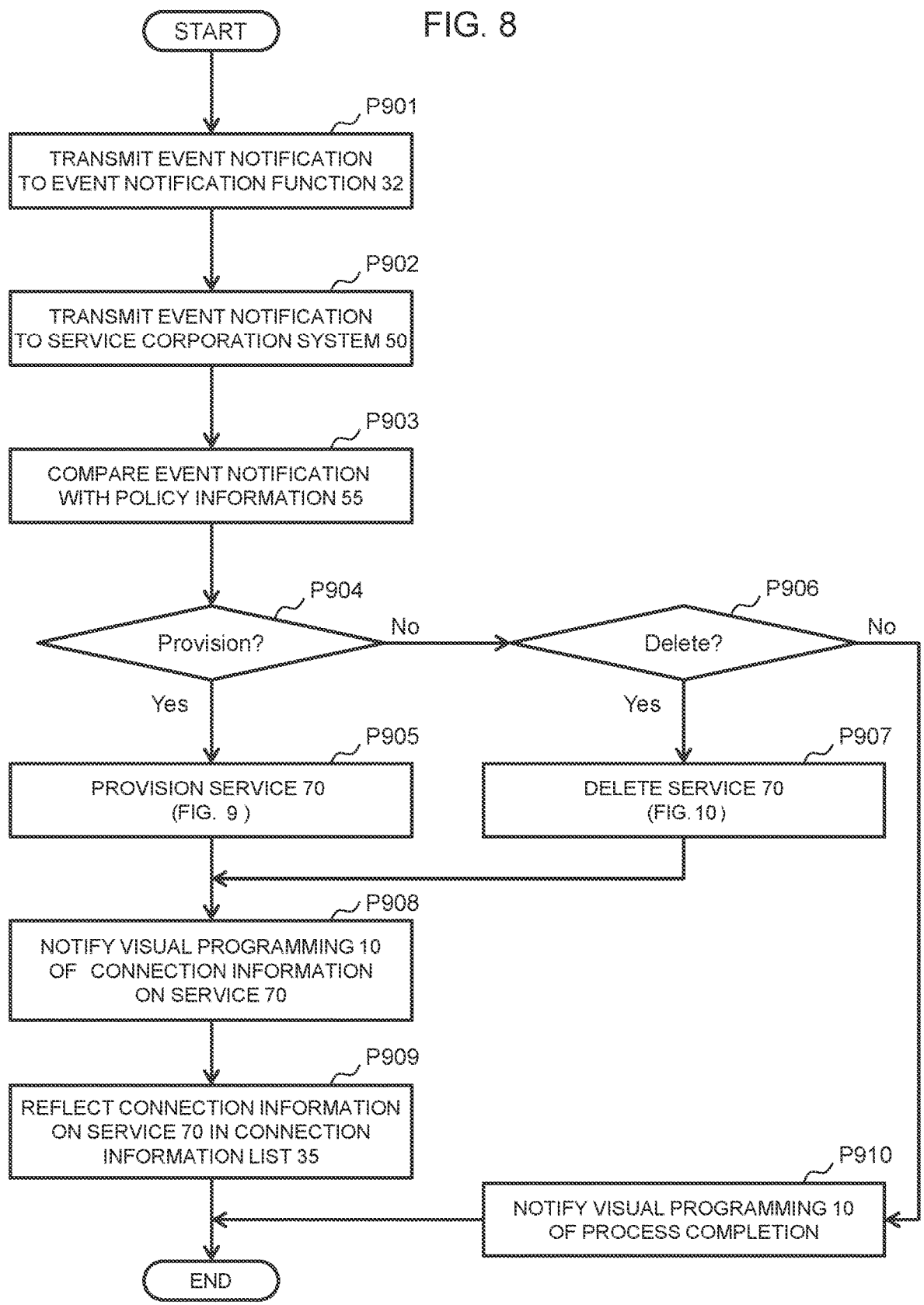
FIG. 8 is a diagram illustrating an event notification process.

FIG. 8 illustrates an event notification process.

In this process, beginning at an event such as the flow execution in the visual programming system 10, the service 70 is created or deleted, and the connection information on the service 70 is dynamically reflected in the visual programming system 10. Accordingly, the user 40 is not required to preliminarily create or delete the service 70 and to set or delete the connection information on the service 70 individually for the property of the node 211, thereby reducing the operation load on the user 40.

First, upon detection of occurrence of an event, the flow editing function 11 or the flow execution function 12 transmits event notification that is notification on this event to the event notification function 32 (P901).

Next, the event notification function 32 having received this event notification transmits event notification on the event represented by this notification, to the service cooperation system 50 (P902).

In the service cooperation system 50 having received this event notification, the event detection function 51 compares the event notification with the policy information 55 (P903). The event detection function 51 determines whether or not the event represented by the event notification (for example, the event occurrence cause) conforms to the condition represented by the Provision 504 or the Delete 505 corresponding to the ResourceId 500 (and ServiceId 501) coinciding with the ResourceId (and ServiceId) included in the event notification. Hereinafter, in the description with reference to FIG. 8, the service using node corresponding to ResourceId included in the event notification is referred to as "using node of interest", and the service 70 corresponding to ServiceId included in the event notification is referred to as "service 70 of interest".

In a case of coinciding with the Provision 504 (P904: Yes), the event detection function 51 executes the creation process (P905).

In a case of coinciding with the Delete 505 (P906: Yes), the event detection function 51 executes the deletion process (P907).

In a case of not coinciding with any of them (P906: No), the event detection function 51 returns a reply of completion of the process, to the visual programming system 10 (P910).

When the event notification represents "forcibly create" event, P905 may be performed without determination in P904 and P906. When the event notification represents "forcibly terminate" event, P907 may be performed without determination in P904 and P906.

In the creation process (P905), the service creation function 52 requests the service management system 60 capable of creating the service of interest (the service management system 60 represented by the SystemId 520 corresponding to the service of interest) to create the service 70 of interest that is connected to the using node of interest, and notifies the event detection function 51 of the connection information (the connection information on the service 70 of interest) acquired as a result thereof. The details of the creation process P905 will be described with reference to FIG. 9.

In the deletion process (P907), the service deletion function 53 requests the service management system 60 having created the service of interest (the service management system 60 represented by the SystemId 520 corresponding to the service of interest) to delete the service 70 of interest, and notifies the event detection function 51 of ResourceId of the deleted service 70. The details of the deletion process will be described with reference to FIG. 10.

Subsequently, the event detection function 51 transmits, to the visual programming system 10, the connection information on the created or deleted service 70 of interest (for example, data other than Status 704 in the record in the connection information list 35) (P908). Note that when the process of deleting the service 70 is executed, the value of the record other than that of ResourceId may be void.

In the visual programming system 10, the connection management function 34 reflects (for example, adds) the connection information received from the service cooperation system 50 in the connection information list 35 (P909). Specifically, for example, when the received connection information is a record part other than Status in the record of the connection information list 35, the connection management function 34 adds the record part to the connection information list 35. On the other hand, for example, when the connection information is information where values other than ResourceId are void, the connection management function 34 deletes the record having ResourceId 700 coinciding with ResourceId of the received connection information, from the connection information list 35.

According to the processes described above, beginning at an event such as the flow execution in the visual programming system 10, the service 70 is created or deleted, and the connection information thereof is dynamically reflected in the connection information list 35 of the visual programming system 10.

Figure 9:
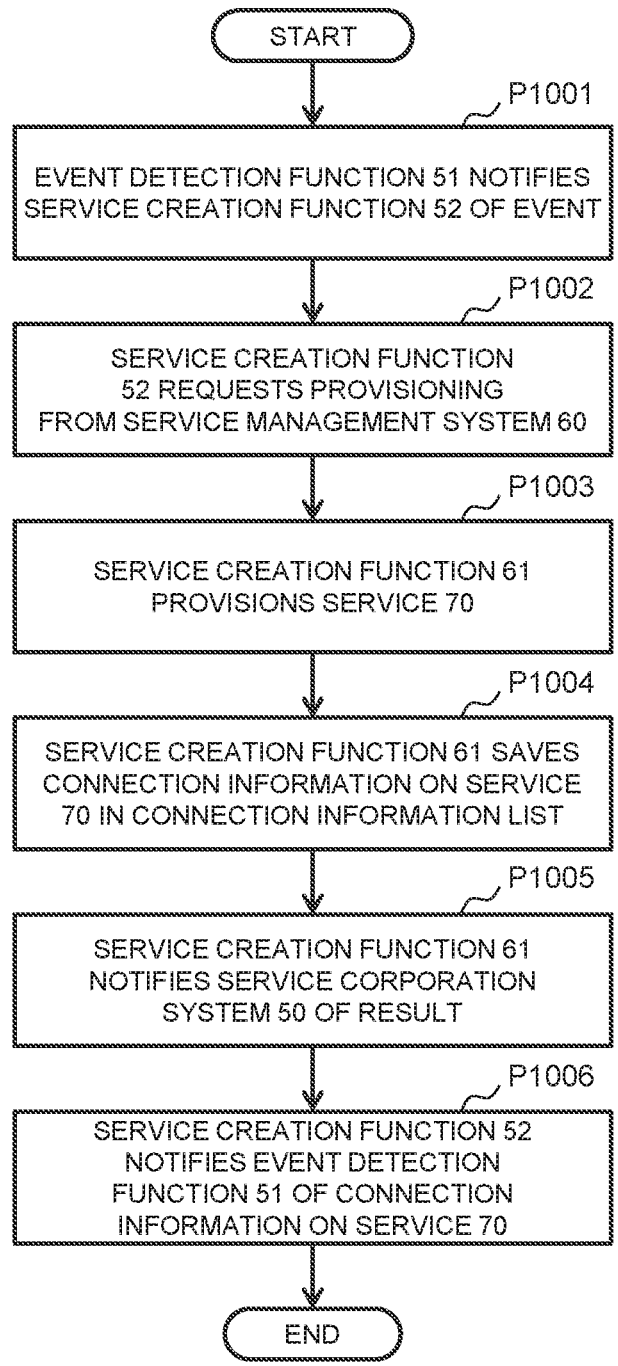
FIG. 9 is a diagram illustrating a creation process.

FIG. 9 illustrates a process of creating the service 70. This process is details of P905 in FIG. 8.

First, the event detection function 51 notifies the service creation function 52 of occurrence of an event (P1001).

Next, the service creation function 52 responds to the notification, accesses the management system information 57, and acquires the record including ServiceId of the event notification in the Services 523. Subsequently, the service creation function 52 acquires the Endpoint 521 and the Credential 522 of the record, accesses the service management system 60 represented by the Endpoint 521 using the authentication information represented by the Credential 522, and requests creation of an instance of the service 70 corresponding to ResourceId and ServiceId of the event notification (P1002). The identifier of the service 70 is, for example, instance_id of OpenServiceBroker.

Subsequently, the service creation function 61 of the service management system 60 creates the requested service 70 (P1003). According to this creation, the connection information on the service 70 (for example, the information including the endpoint and the authentication information) is issued according to a method defined in the service management system 60.

Subsequently, the service creation function 61 saves the connection information on the service 70 in the connection information list 63 (P1004). Subsequently, the service creation function 61 transmits, to the service cooperation system 50, the connection information on the service 70 (the connection information saved in P1004) as a notification of completion of the creation process (P1005).

The service creation function 52 of the service cooperation system 50 transmits, to the event detection function 51, the transmitted connection information, and ServiceId and ResourceId of the event notified by the event detection function 51 (that is, the record part of the connection information list 35 excluding the Status 704) (P1006).

According to the processes described above, creation of the service 70 is achieved.

Figure 10:
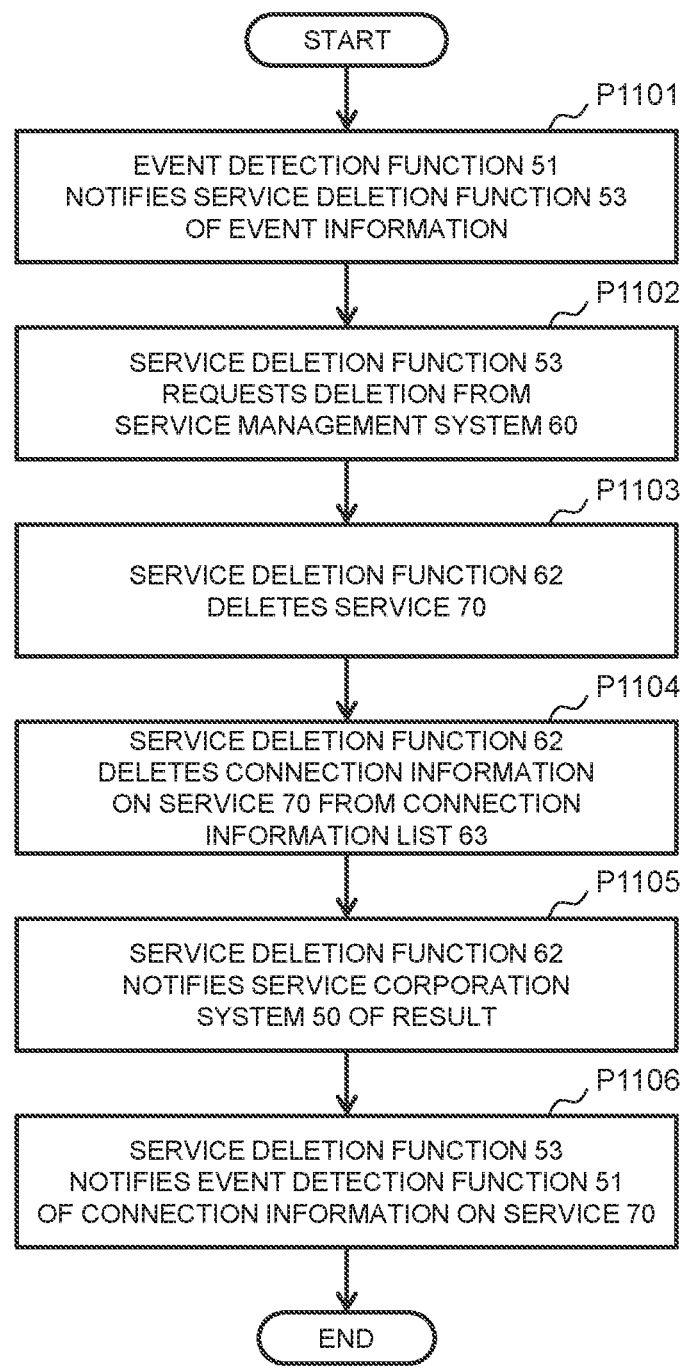
FIG. 10 is a diagram illustrating a deletion process.

FIG. 10 illustrates a process of deleting the service 70. This process is details of P907 in FIG. 8.

First, the event detection function 51 notifies the service deletion function 53 of occurrence of an event (P1101).

Next, the service deletion function 53 responds to the notification, accesses the management system information 57, and acquires the record including the value of ServiceId of the event notification in the Services 523. Subsequently, the service deletion function 53 acquires the Endpoint 521 and the Credential 522 of the record, accesses the service management system 60 represented by the Endpoint 521 using the authentication information represented by the Credential 522, and requests deletion of an instance of the service 70 corresponding to ResourceId and ServiceId of the event notification (P1102).

Subsequently, the service deletion function 62 of the service management system 60 deletes the requested service 70 (P1103).

Subsequently, the service deletion function 62 deletes the record corresponding to the deleted service 70 from the connection information list 63 (P1104). Subsequently, the service deletion function 62 transmits a notification of completion of the deletion process to the service cooperation system 50 (P1105).

The service deletion function 53 of the service cooperation system 50 transmits ResourceId of the deleted service 70 to the event detection function 51 (P1106).

According to the processes described above, deletion of the service 70 is achieved.

Figure 11:
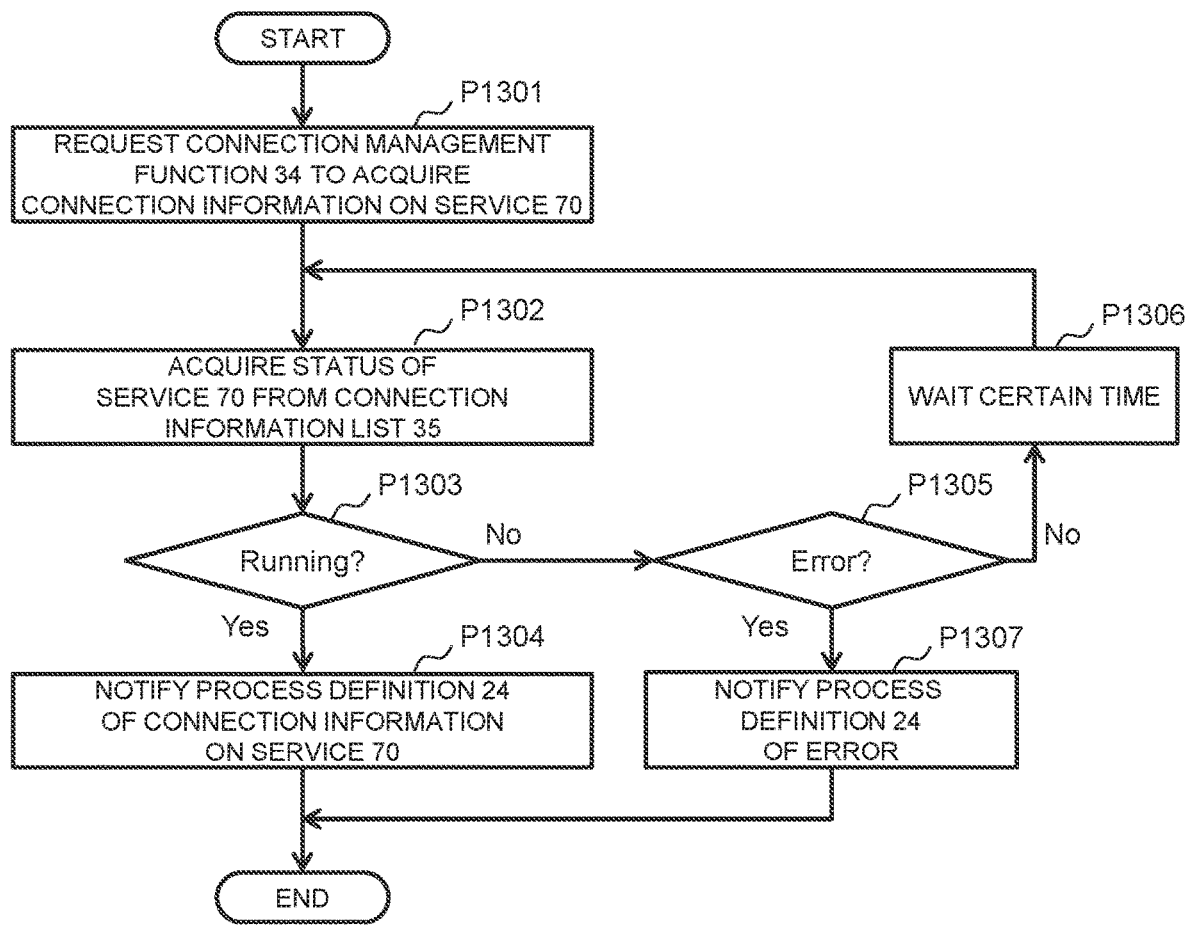
FIG. 11 is a diagram illustrating a temporary stop process for each node.

FIG. 11 is a diagram illustrating a temporary stop process for each node.

While the status of each service 70 is monitored by the service monitoring function 33 and reflected in the Status 704, a temporary stop process on a node-by-node basis is a process of making the process of the node stand by or interrupting the process on the basis of the Status 704 of the service 70. According to this process, the visual programming system 10 can prevent the service using node from being executed before the service 70 is created or in a state where the service 70 cannot be used owing to an error or the like of the service 70, thereby allowing the processes of the flow to be prevented from being adversely affected.

When the process definition 24 of the service using node is executed by the flow execution function 12 during execution of the flow 221, the process definition 24 (program) requests the connection management function 34 to acquire the connection information, with ResourceId included in the property of the service using node being adopted as an argument (P1301).

Next, the connection management function 34 acquires the values of the Endpoint 702, the Credential 703 and the Status 704, from the record having the ResourceId 700 coinciding with ResourceId of the argument, in the connection information list 35 (P1302).

Subsequently, when the Status 704 is "Running" (P1303: Yes), the connection management function 34 transmits, to the process definition 24, the acquired Endpoint 702 and Credential 703 (P1304).

When the Status 704 is "Error" (P1305: Yes), the connection management function 34 notifies the process definition 24 of an error (P1307). The process definition 24 notified of the error interrupts access to the service 70. In the case of interruption, the flow may be executed from the beginning.

When the Status 704 is not "Running" nor "Error" (for example, "Provisioning") (P1305: No), the connection management function 34 stands by for a predetermined time (P1306) and subsequently re-executes P1302. That is, when the service 70 is not an error but the service 70 is inaccessible, access to the service 70 is made to stand by.

According to the process described above, access to the service 70 is made to stand by or is interrupted when the Status 704 of the service 70 is other than "Running". Accordingly, the service 70 is not invoked in a state where the service 70 cannot be used, and the adverse effects on the flow can be avoided.

Figure 12:
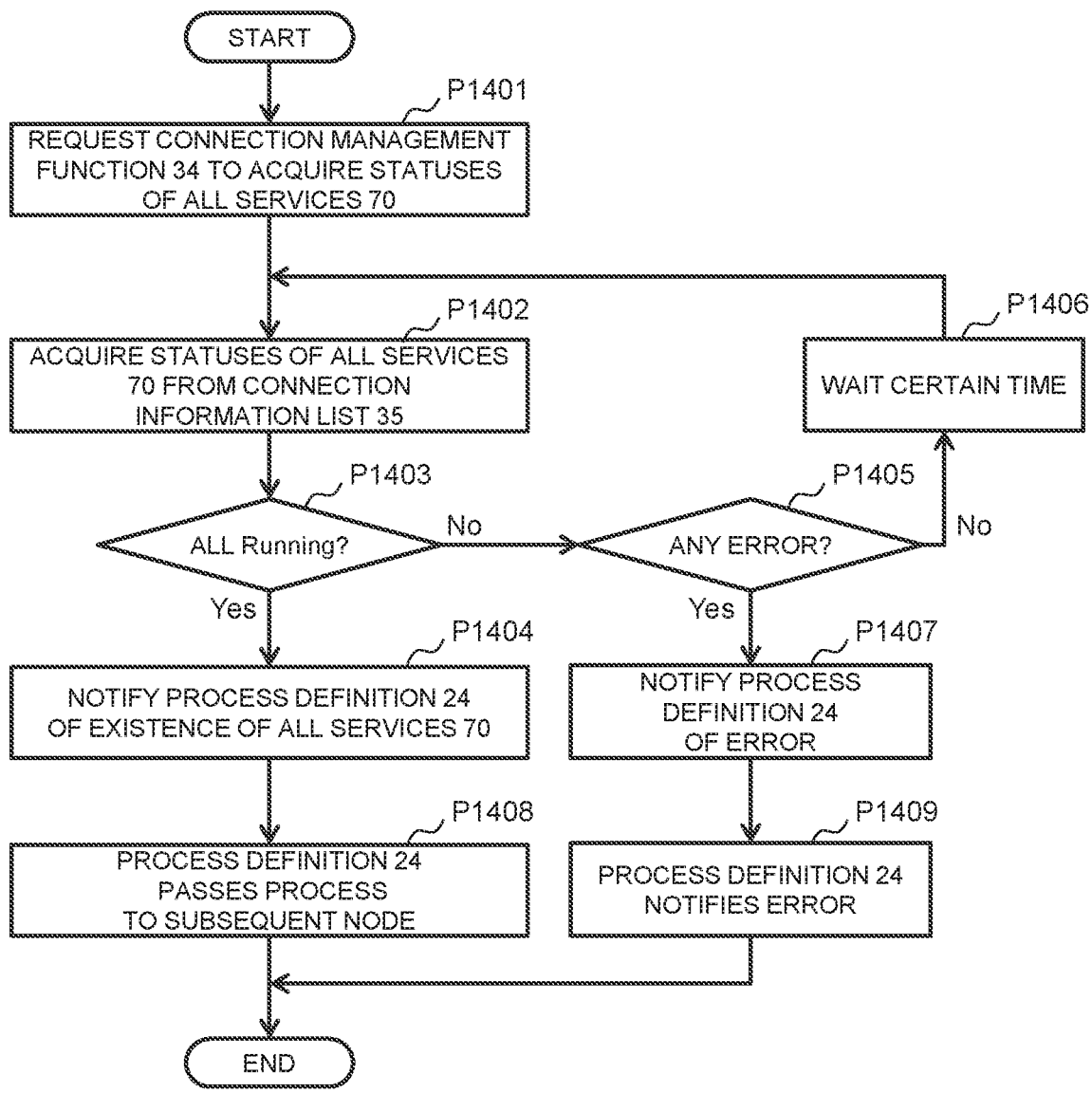
FIG. 12 is a diagram illustrating a temporary stop process for the entire flow.

FIG. 12 is a diagram illustrating a temporary stop process for the entire flow.

The temporary stop process of the entire flow is a process of causing the activation verification node to make the flow stand by or to interrupt the flow on the basis of the Status 704 of each of all the services 70 connected to all the subsequent service using nodes in the flow. According to this process, the visual programming system 10 can verify that all the services 70 after the activation verification node are in a usable state, and then execute the flow. Consequently, invocation of any of services 70 in an unusable state to affect execution of the flow can be avoided.

When the process definition 24 of the activation verification node is executed by the flow execution function 12 during execution of the flow 221, the process definition 24 requests the connection management function 34 to verify the statuses of all the services that all the service using nodes after the activation verification node (all the service using nodes that can be executed after the activation verification node in the flow including the activation verification node) access (P1401). Specifically, for example, as follows. That is, the process definition 24 accesses the flow information 13 in the activation verification node. The process definition 24 acquires the entire information on the nodes connected on the output side of the activation verification node until the end of the flow, through the wires 406 in the flow information 13. Subsequently, the process definition 24 extracts the service using nodes from the acquired group of nodes, and acquires ResourceId of each of all the acquired service using nodes. Subsequently, the process definition 24 requests the connection management function 34 to acquire the connection information, with all the acquired ResourceIds being adopted as an argument.

Next, the connection management function 34 acquires the values of the Endpoint 702, the Credential 703 and the Status 704, from the record having the ResourceId 700 coinciding with ResourceId, with respect to each ResourceId provided as the argument, in the connection information list 35 (P1402).

Subsequently, when every acquired Status 704 is "Running" (P1403: Yes), the connection management function 34 transmits the entire acquired connection information (the Endpoint 702 and the Credential 703) to the process definition 24 (P1404), and the process definition 24 passes the processing to the subsequent node 211 (P1408).

When at least one acquired Status 704 is "Error" (P1405: Yes), the connection management function 34 notifies the process definition 24 of the list of ResourceId corresponding to "Error" (P1407). Subsequently, the process definition 24 notifies the flow editing function 11 of the list of ResourceId (P1409). The flow editing function 11 notified of the list may interrupt the execution of the flow. For example, the flow editing function 11 may display, on the GUI screen 200 (or another GUI screen), the list of the service using nodes corresponding to ResourceId on the notified list.

When the acquired Status 704 has no "Error" but has a value other than "Running" and "Error" (for example, "Provisioning") (P1405: No), the connection management function 34 stands by for a predetermined time (P1406) and subsequently re-executes P1402. That is, when every service 70 is not an error but any service 70 is inaccessible, access to the service 70 is made to stand by.

According to the processes described above, execution of the flow is made to stand by or is interrupted when the Status of every service 70 after the activation verification node is other than "Running". Accordingly, the service 70 is not invoked in a state where the service 70 cannot be used, and the adverse effects on the flow can be avoided.

Figure 13:
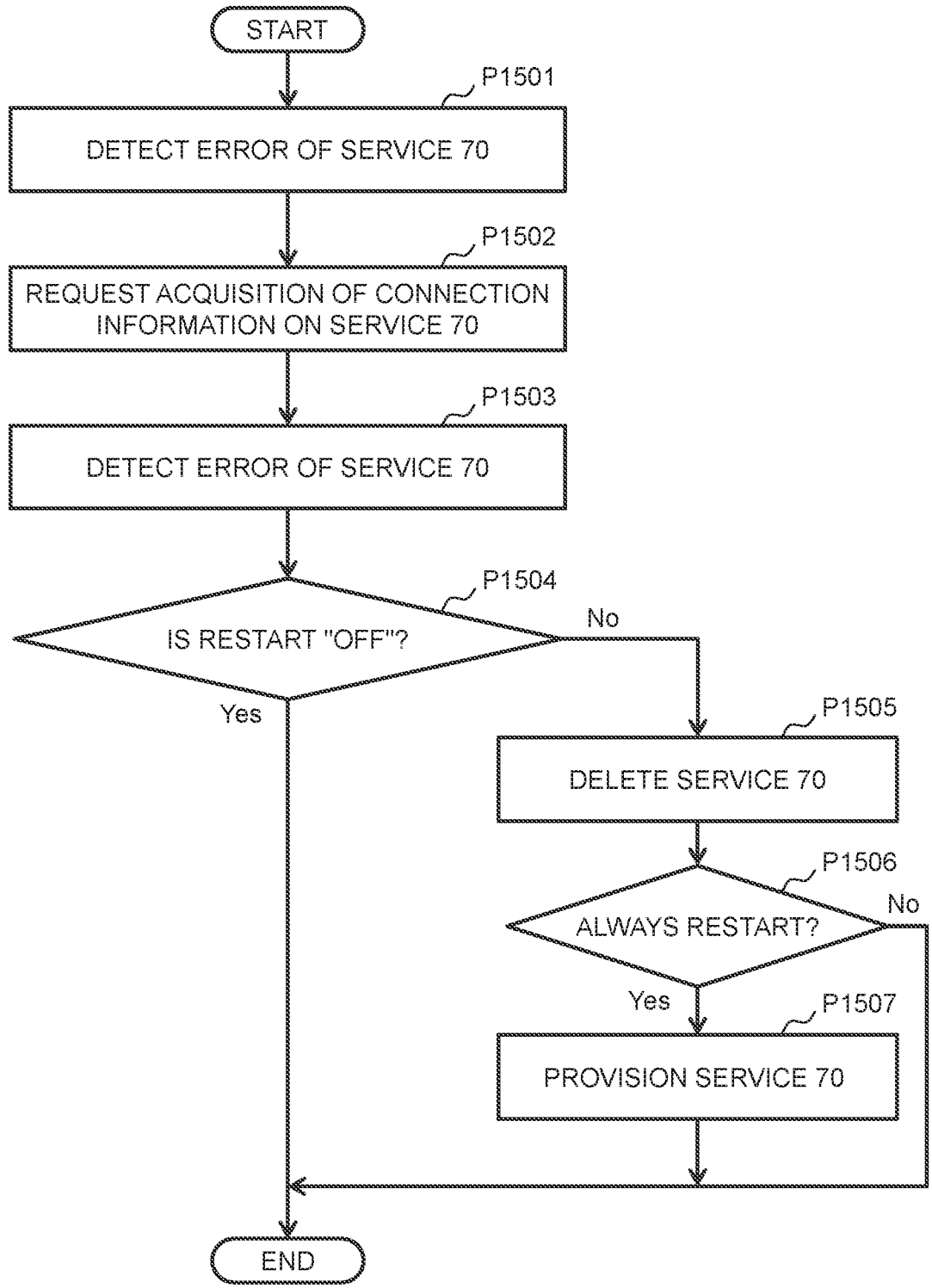
FIG. 13 is a flowchart of a service reactivation process.

FIG. 13 illustrates a service reactivation process.

The service reactivation process is a process of restarting the service 70 on the basis of the policy information 55 set by the user 40, when the service monitoring function 33 detects an error of the service 70. This process negates the need to restart the service 70 manually by the user 40 when an error occurs in the service 70. The restart timing in this case can be designated by the user 40.

When the service monitoring function 33 detects that the state of the service 70 is an error because a normal value is not returned from the service 70 or the like in the monitoring process (P1501), the connection management function 34 is requested to reacquire the connection information on the service 70, with ResourceId of the service 70 being adopted as an argument (P1502). In response to request, the connection management function 34 acquires, from the connection information list 35, the connection information corresponding to ResourceId 700 coinciding with ResourceId adopted as the argument, and passes the acquired connection information to the service monitoring function 33. The service monitoring function 33 tries to access the service 70 using the passed connection information.

However, when an error of the service 70 is detected owing to a reason, such as a failure of the monitoring process for the service 70 (or the connection management function 34 is notified of a failure of reacquisition of the connection information) (P1503), the service monitoring function 33 verifies the value of Restart 506 corresponding to the ResourceId 500 coinciding with the ResourceId of the service 70, based on the policy information 55.

When the value of Restart 506 is "OFF" (P1504: Yes), the service monitoring function 33 finishes the reactivation process.

When the value of Restart 506 is other than "OFF" (P1504: No), the service monitoring function 33 transmits a notification about a forcible terminating event to the event notification function 32. When the event notification function 32 receives the notification about the forcibly terminating event, the processes in and after P907 in FIG. 8 are performed. That is, the service 70 is deleted, the connection information on the service 70 is deleted from the connection information list 35 (P1505).

Subsequently, when the value of Restart 506 is "always" (P1506: Yes), the service monitoring function 33 transmits a notification about a forcible creation event to the event notification function 32. When the event notification function 32 receives the notification about the forcible creation event, the processes in and after P905 in FIG. 8 are performed. That is, the service 70 is created, the connection information on the service 70 is registered in the connection information list 35 (P1507).

After P1505, the value of Restart 506 is not "always" (for example, in the case of "conform to automatic creation condition") (P1506: No), the reactivation process is finished. The service 70, having been deleted in P1505 but having not been created in this reactivation process, is subsequently created when an event satisfying the condition of Provision 504 in the policy information 55 occurs in the visual programming system 10.

According to the processes described above, in case the service 70 is abnormal, the visual programming system 10 can restart the service based on update of the connection information and on the policy information 55.

Second Embodiment

Hereinafter, a second embodiment is described. In this case, the difference from the first embodiment is mainly described. The description of the common points from the first embodiment is briefly made or omitted.

Figure 14:
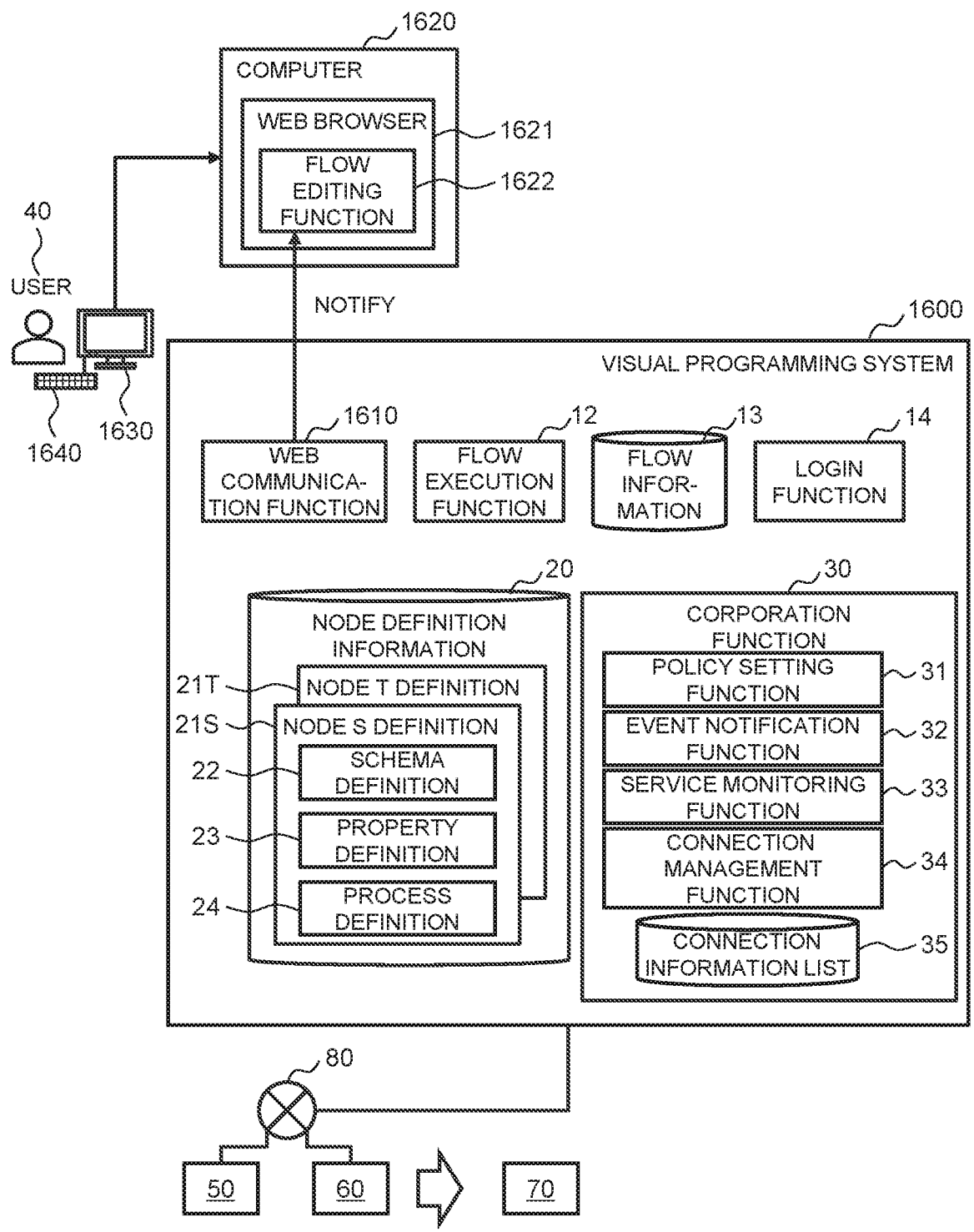
FIG. 14 is a block diagram showing an example of a system configuration in a second embodiment of the present invention.

FIG. 14 is a block diagram showing an example of the system configuration in the second embodiment of the present invention.

The system illustrated in FIG. 14 is provided with a visual programming system 1600, instead of the visual programming system 10 in FIG. 1. The visual programming system 1600 is provided with a web communication function 1610, instead of the flow editing function 11.

A computer 1620 is provided with a web browser 1621. The web browser 1621 is provided with a flow editing function 1622. The flow editing function 1622 can operate on the web browser 1621. The computer 1620 includes an output device 1630 and an input device 1640. Furthermore, the computer 1620 is coupled to the web communication function 1610 via the network 80.

The web browser 1621 is an application that operates on the computer 1620. The web browser 1621 issues an HTTP or HTTPS request to the visual programming system 1600, and displays data acquired as the response, on the output device 1630 of the computer 1620. At this time, the web browser 1621 can display the flow editing function 1622 on the output device 1630.

The web communication function 1610 transmits, to the web browser 1621, data that defines the processes of the flow editing function 1622, based on the HTTP request by the web browser 1621. Based on the HTTP request by the flow editing function 1622 operating on the web browser 1621, in order to achieve flow editing on the web browser 1621, the web communication function 1610 relays control instructions of various processes and data.

The flow editing function 1622 is a function allowing the flow editing function 11 to operate on the web browser 1621. When the flow editing function 1622 uses the various types of data and functions in the system in FIG. 14, this function uses them via the web communication function 1610.

According to the above description, the system in FIG. 14 can create the flow 221 using the remote computer 1620 as the web application.

The above description can be summarized as follows, for example.

The service cooperation system 50 and a cooperation function 30 are an example of the service cooperation system. The service cooperation system 50 is an example of a first function. The cooperation function 30 is an example of a second function. When the flow 221 on the GUI screen 200 (the example of a flow editing screen) provided by the visual programming system 10 or 1600 includes the service using node 222, and a user request for connecting the service 70 (an example of the external service) to the service using node 222 is detected, the service cooperation system 50 transmits a request for creating the service 70, to the service management system 60 including the creation function 61 for the service 70. The service cooperation system 50 acquires, from the service management system 60, connection information (connection information created by the service management system 60) for connection to the service 70 created by the service management system 60 in response to the creation request. The cooperation function 30 sets the connection information acquired by the service cooperation system 50, in the property of the service using node 222. As described above, in editing of the flow 221, the service 70 is dynamically created, and the connection information on the created service 70 is automatically set in the property of the service using node 222. Accordingly, the user is not required to create the service 70 preliminarily, and manually set the connection information on the service 70. Accordingly, trial and error utilizing the flow 221 including the service using node 222 can be performed at high speed.

The cooperation function 30 may accept, from the user 40, designation of the policy including at least one of the automatic creation condition ("Provision") and automatic deletion condition ("Delete") of the service 70. The service cooperation system 50 may comply with the policy information representing the policy designated by the user 40. Accordingly, the service 70 can be created or deleted in conformity with the policy desired by the user 40.

When the service cooperation system 50 detects the user request pertaining to the service 70, the creation request concerning the service 70 may be transmitted to the service management system 60 upon satisfaction of the automatic creation condition designated in the policy information. Accordingly, the timing when the service 70 is created may be timing desired by the user 40.

When the automatic deletion condition designated in the policy information is satisfied, the service cooperation system 50 may transmit the deletion request concerning the service 70 to the service management system 60. Accordingly, the timing when the service 70 is created may be timing desired by the user 40.

The cooperation function 30 writes the acquired connection information in the connection information list 35. When the Status 704 of the service using node 222 is not "Running" (an example where the service using node 222 detects that the service 70 cannot be invoked using the connection information set in the property), the cooperation function 30 acquires the connection information on the service 70 from the connection information list 35, and accesses the service 70 using the acquired connection information, and when the access fails, the cooperation function 30 transmits the deletion request to the service management system 60 upon satisfaction of the deletion condition, and subsequently, the creation request concerning the service 70 may be transmitted to the service management system 60 upon satisfaction of the creation condition. The "deletion condition" in this paragraph may be forcible deletion that is immediate deletion in response to an access failure, or any condition by the user 40. Likewise, the "creation condition" in this paragraph may be forcible creation that is creation immediately after forcible deletion, or any condition by the user 40. Accordingly, when the access to the service 70 is disabled owing to an error of the service 70 or another reason, the service 70 does not need to be manually restarted.

When the Status 704 of the service using node 222 is not "Running", the cooperation function 30 may acquire the connection information on the service 70 from the connection information list 35, and access the service 70 using the acquired connection information. Accordingly, when the access to the service 70 is disabled owing to an error of the service 70 or another reason, the cooperation function 30, instead of the service using node 222, can check whether the access to the service 70 is enabled or not.

The cooperation function 30 may monitor whether access to the service 70 is enabled or not. When the access to the service 70 is disabled, the cooperation function 30 may make a process of the service using node 222 connected to the service 70 stand by or interrupt the process. Accordingly, execution of the service using node 222 in the state where the service 70 is inaccessible before creation of the service 70 or owing to an error of the service 70, can be avoided.

The cooperation function 30 can monitor each of all the service using nodes 222 included in the flow 221, about whether the service 70 connected to the service using node 222 is accessible or not. In case where at least one service 70 invoked from one or more service using nodes 222 to be executed after the activation verification node (an example of the node in execution) in the flow 221 is inaccessible, execution of the flow 221 may be made to stand by or be interrupted. Accordingly, it is verified that all the services 70 after the activation verification node are in the usable state, and then the flow can be executed.

The service cooperation system 50 may be provided outside of the visual programming system 10 or 1600. The cooperation function 30 may be provided in the visual programming system 10 or 1600. When connection of the service 70 to the service using node 222 is requested by the user 40, the cooperation function 30 may transmit a notification about an event representing occurrence of the user request, to the service cooperation system 50. The reception of the notification by the service cooperation system 50 may be detection of the user request by the service cooperation system 50. Accordingly, for a plurality of visual programming systems 10 or 1600, a single service cooperation system 50 may be provided.

The flow information 13 representing the flow 221 may include information representing ResourceId (an example of a predetermined type of ID) of the service using node 222. The creation request to the service management system 60 may be associated with ResourceId of the service using node 222. The connection information created by the service management system 60 and stored in the connection information list 63 may be associated with ResourceId (for example, a key such as a combination of ResourceId and ServiceId). The connection information acquired by the service cooperation system 50 and managed in the connection information list 35 may be associated with ResourceId (for example, a key identical to the key). Accordingly, the connection information can be acquired from the connection information list 35 using ResourceId of the service using node.

Some embodiments of the present invention have thus been described above. However, the present invention is not limited to the embodiments described above. Various modified examples and equivalent configurations within the spirit of the accompanying claims are also encompassed. For example, these embodiments are detailed description for clearly illustrating the present invention. The present invention is not necessarily limited to what includes all the described configuration elements.

What is claimed is:

1. A service cooperation support system, comprising:
a visual programming system including a memory coupled to a processor and a display coupled to the processor;
a service cooperation system including a memory coupled to a processor; and
a service management system including a memory coupled to a processor,
wherein the visual programming system, the service cooperation system, and the service management system are connected via a network,
wherein the processor of the visual programming system is configured to create a flow and execute the flow and display a graphical user interface (GUI) to enable a user to create the flow and execute the flow,
wherein the flow is a series of two or more nodes, which are programming modules, and at least a first node of the two or more nodes invokes a function of a service upon execution of the first node,
wherein the service is configured to be connected to the first node via the connection information and the visual programming system is configured to operate the service via an Application Programming Interface (API),
wherein the processor of the visual programming system is configured to, upon receiving a request from a user to execute the flow, transmit a notification to the service cooperation system,
wherein the processor of the service cooperation system is configured to, upon receiving the notification, transmit a creation request to create the service to the service management system, wherein the service management system receives the creation request which has a creation function for an external service, wherein the processor of the service cooperation system is configured to acquire, from the service management system, the connection information that is information for connection to the external service created by the service management system in response to the creation request and is information created by the service management system, and wherein the processor of the service cooperation system is configured to set the acquired connection information in a property of the first node, wherein the processor of the service cooperation system is configured to write the acquired connection information, in a connection information list that is information managed by the processor of the visual programming system, and wherein the processor of the service cooperation system is configured to, upon determining the first node cannot be invoked using the connection information set in the property, acquire the connection information of the service from the connection information list, and accesses the service using the acquired connection information, and upon determining the access fails, transmit a deletion request of the service, upon satisfaction of a deletion condition that is a condition of deleting the service, and subsequently transmit a creation request of the service to the service management system, upon satisfaction of a creation condition that is a condition of creating the service.

2. The service cooperation support system according to claim 1, wherein the processor of the service cooperation system is configured to accept, from a user, a designation of a policy including a condition of at least one of creation and deletion of the service, and comply with policy information representing the policy designated by a user by at least creating or deleting the service.

3. The service cooperation support system according to claim 2, wherein the processor of the service cooperation system is configured to, when the deletion condition that is the condition of deleting the service and is designated in the policy information is satisfied, transmit the deletion request concerning the external service to the service management system.

4. The service cooperation support system according to claim 1, wherein the processor of the service cooperation system is configured to write the acquired connection information in the connection information list that is managed by the visual programming system, and upon determining the service cannot be invoked using the connection information set in the property, acquire connection information of the service from the connection information list, and access the service using the acquired connection information.

5. The service cooperation support system according to claim 1, wherein the processor of the service cooperation system is configured to monitor whether access to the service is enabled, and upon determining the access to the service is disabled, change a state of the first node to stand by.

6. The service cooperation support system according to claim 1, wherein flow information representing the flow includes information representing a predetermined type of ID for each node of the flow, wherein the creation request is associated with the predetermined type of ID of the first node, wherein the connection information created by the service management system and managed by the service management system is associated with the predetermined type of ID, and wherein the connection information acquired by the service cooperation system and managed by the visual programming system is associated with the predetermined type of ID.

7. A service cooperation support method of a service cooperation support system including a visual programming system including a memory coupled to a processor and a display coupled to the processor; a service cooperation system including a memory coupled to a processor; and a service management system including a memory coupled to a processor, wherein the visual programming system, the service cooperation system, and the service management system are connected via a network, wherein the processor of the visual programming system is configured to create a flow and execute the flow and display a graphical user interface (GUI) to enable a user to create the flow and execute the flow, wherein the flow is a series of two or more nodes, which are programming modules, and at least a first node of the two or more nodes invokes a function of a service upon execution of the first node, the method comprising:

upon receiving a request from a user to execute the flow, transmitting a creation request to create the service to the service management system, acquiring, by the service cooperation system and from the service management system, connection information that is information for connection to an external service created by the service management system in response to the creation request and is information created by the service management system; and setting, by the service cooperation system, the acquired connection information in a property of the first node, writing by the service cooperation system the acquired connection information, in a connection information list that is information managed by the processor of the visual programming system, and upon determining the first node cannot be invoked using the connection information set in the property, acquiring by the service cooperation system the connection information of the service from the connection information list, and accessing the service using the acquired connection information, and upon determining the access fails, transmitting a deletion request of the service, upon satisfaction of a deletion condition that is a condition of deleting the service, and subsequently transmitting a creation request of the service to the service management system, upon satisfaction of a creation condition that is a condition of creating the service.

* * * * *